US010201849B2

(12) United States Patent
Gouin et al.

(10) Patent No.: US 10,201,849 B2
(45) Date of Patent: *Feb. 12, 2019

(54) COMPOSITION, A METHOD FOR PREPARING SAID COMPOSITION, A METHOD FOR PREPARING A RIGIDIFIED FABRIC, THE RIGIDIFIED FABRIC SO OBTAINED, A FILTRATION DEVICE, METHODS FOR THE MANUFACTURE OF THE FILTRATION DEVICE, INSTALLATION, PROCESS AND USE OF SAID FILTRATION DEVICE FOR THE FILTRATION OF A LIQUID METAL OR AN ALLOY THEREOF

(71) Applicant: LES PRODUITS INDUSTRIELS DE HAUTE TEMPERATURE PYROTEK INC., Sherbrooke, Quebec (CA)

(72) Inventors: Marcel Gouin, Sherbrooke (CA); Maurice Lacasse, Stoke (CA)

(73) Assignee: LES PRODUITS INDUSTRIELS DE HAUTE TEMPERATURE PYROTEK INC., Sherbrooke, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/113,754

(22) PCT Filed: Jan. 23, 2015

(86) PCT No.: PCT/CA2015/050047
§ 371 (c)(1),
(2) Date: Jul. 22, 2016

(87) PCT Pub. No.: WO2015/109408
PCT Pub. Date: Jul. 30, 2015

(65) Prior Publication Data
US 2017/0008075 A1    Jan. 12, 2017

Related U.S. Application Data

(60) Provisional application No. 61/930,800, filed on Jan. 23, 2014.

(51) Int. Cl.
*B22C 9/08* (2006.01)
*C03C 25/1095* (2018.01)
(Continued)

(52) U.S. Cl.
CPC .............. *B22C 9/086* (2013.01); *B22D 18/04* (2013.01); *C03C 25/1095* (2013.01);
(Continued)

(58) Field of Classification Search
CPC ................................ B22C 9/086; B22D 18/04
See application file for complete search history.

(56) References Cited

U.S. PATENT DOCUMENTS 4,781,858 A    11/1988  Mizukami et al.
4,857,489 A    8/1989   Bearden
(Continued)

FOREIGN PATENT DOCUMENTS

WO    WO 2008/034856 A2    3/2008
WO    WO 2011/019593 A1    2/2011
WO    WO 2015/109408 A1    7/2015

OTHER PUBLICATIONS

International Preliminary Report on Patentability for International Patent Application No. PCT/CA2015/050047 dated Apr. 26, 2016, 72 pages.
(Continued)

*Primary Examiner* — Scott R Kastler
(74) *Attorney, Agent, or Firm* — Brinks Gilson & Lione

(57) ABSTRACT

A composition for preparing a rigidified fabric made of heat resistant fibers or threads of heat resistant fibers, preferably of woven threads made of heat resistant fibers, said com-
(Continued)

position comprising a mixture of a product A and a product B, the product A being obtained by polymerization of carbohydrate units, natural or synthetic, preferably a saccharide, and more preferably a sugar such as glucose, fructose, galactose, sucrose, maltose, lactose, etc.; and the product B consisting of at least one additive such as a binding agent. A method for preparing said composition, a method for preparing a rigidified fabric of heat resistant fibers, the method for the manufacture of filtering devices, filtering devices so obtained, their use for the filtering of metal, and installation and process involving said filtering devices.

30 Claims, 15 Drawing Sheets

(51) Int. Cl.
| | | |
|---|---|---|
| *C03C 25/321* | (2018.01) | |
| *C04B 35/626* | (2006.01) | |
| *C04B 35/628* | (2006.01) | |
| *C04B 35/63* | (2006.01) | |
| *C04B 35/636* | (2006.01) | |
| *B22D 18/04* | (2006.01) | |
| *D06M 13/148* | (2006.01) | |

(52) U.S. Cl.
CPC ........ *C03C 25/321* (2013.01); *C04B 35/6263* (2013.01); *C04B 35/6267* (2013.01); *C04B 35/62873* (2013.01); *C04B 35/6306* (2013.01); *C04B 35/636* (2013.01); *D06M 13/148* (2013.01); *B01D 2239/04* (2013.01); *B01D 2239/0457* (2013.01); *B01D 2239/0492* (2013.01); *C04B 2235/3212* (2013.01); *C04B 2235/3217* (2013.01); *C04B 2235/3418* (2013.01); *C04B 2235/448* (2013.01); *C04B 2235/5232* (2013.01); *C04B 2235/5454* (2013.01)

(56) References Cited

U.S. PATENT DOCUMENTS

| | | | |
|---|---|---|---|
| 6,254,810 B1 | 7/2001 | Delvaux et al. | |
| 6,270,717 B1 | 8/2001 | Tremblay et al. | |
| 8,273,289 B2 | 9/2012 | Hitchings | |
| 8,939,193 B2 | 1/2015 | Stoyanov et al. | |
| 2017/0008075 A1* | 1/2017 | Gouin | C03C 25/1095 |
| 2017/0028466 A1* | 2/2017 | Gouin | B22D 43/00 |

OTHER PUBLICATIONS

International Preliminary Report on Patentability (Corrected Version) for International Patent Application No. PCT/CA2015/050047 dated Apr. 26, 2016, 4 pages.
International Search Report and Written Opinion for International Patent Application No. PCT/CA2015/050047 dated Apr. 27, 2015, 8 pages.
International Search Report and Written Opinion for International Patent Application No. PCT/CA2017/050908 dated Oct. 31, 2017, (11 pages).
European Search Report dated Nov. 23, 2017, for European Patent Application No. 15741063.0, pp. (10).

* cited by examiner

COMPOSITION, A METHOD FOR PREPARING SAID COMPOSITION, A METHOD FOR PREPARING A RIGIDIFIED FABRIC, THE RIGIDIFIED FABRIC SO OBTAINED, A FILTRATION DEVICE, METHODS FOR THE MANUFACTURE OF THE FILTRATION DEVICE, INSTALLATION, PROCESS AND USE OF SAID FILTRATION DEVICE FOR THE FILTRATION OF A LIQUID METAL OR AN ALLOY THEREOF

CROSS-REFERENCE TO RELATED APPLICATIONS

This application is the National Stage of International Application No. PCT/CA2015/050047 filed with the Canadian Patent Office on Jan. 23, 2015, which claims priority to U.S. Provisional Patent Application No. 61/930,800, filed on Jan. 23, 2014, wherein the entirety of each of the aforementioned applications is hereby incorporated by reference.

FIELD OF THE INVENTION

The present invention relates to a composition for preparing a rigidified fabric made of heat resistant fibers, especially a fabric of woven threads made of heat resistant fibers. Preferably, said heat resistant fibers may consist of glass fibers or silica fibers.

The invention also relates to a method for preparing a composition for the manufacture of a rigidified fabric of said heat resistant fibers, especially a fabric of woven threads made of said resistant fibers.

The invention further relates to method for the preparation of a rigidified fabric of heat resistant fibers, especially a fabric of woven threads of said heat resistant fibers, and to the rigidified fabric so obtained.

The invention also relates to methods for the manufacture of a filter for the filtering of a liquid metal (e.g. aluminum) or an alloy thereof, said filter being made of the aforesaid rigidified fabric.

The invention further relates to the filter defined hereinabove, for the filtering of a liquid metal (e.g. aluminum) or an alloy thereof, the filtering being preferably carried out in a low pressure casting process.

The invention further relates to a use of the filter defined hereinabove, for the filtering of a liquid metal (e.g. aluminum) or an alloy thereof, especially in a low pressure casting process.

The invention further relates to a method for the filtering of a liquid metal (e.g. aluminum) or an alloy thereof, especially in a low pressure casting process, said method comprising a step of filtering the liquid metal with the filter as defined hereinabove.

The invention also relates to a new filtration device for the filtration of a liquid metal or an alloy thereof in a low pressure casting process, said casting process being useful for the formation of a molded article in a low pressure casting installation, and said filtration device being made of said rigidified fabric defined hereinabove.

The invention also relates to the filtration device mentioned hereinabove and further provided with an insert made of a magnetisable material, said insert allowing to handle said filtration device with a tool that is provided with a magnet.

The invention also relates to methods for the manufacture of the new filtration device defined hereinabove.

The invention further relates to a use of the new filtration devices defined hereinabove, for the filtering of a liquid metal (e.g. aluminum) or an alloy thereof, especially in a low pressure casting process carried out in a low pressure casting installation.

The invention further relates to a method for the filtering of a liquid metal (e.g. aluminum) or an alloy thereof, especially in a low pressure casting process carried out in a low pressure casting installation, said method comprising a step of filtering the liquid metal with any one of the new filtration device defined hereinabove.

The invention further relates to a low pressure casting installation for the molding of a liquid metal or an alloy thereof, said installation comprising a filter of a filtration device as defined hereinabove.

The invention also relates to a low pressure casting process which useful for the formation a molded article in a low pressure casting installation, wherein said low pressure casting process comprises a step of filtering a liquid metal (e.g. aluminum) or an alloy thereof, with the new filtration device defined hereinabove.

BRIEF DESCRIPTION OF THE PRIOR ART

It has been suggested in the art to apply a protective coating onto a fabric made of fibers or threads made of fibers. More particularly, in the metallurgical industry, such a protective coating is provided for protecting filters made of a fabric of glass fibers that are used during the casting of a liquid metal, such as aluminum.

Filters consisting of a rigidified fabric made from heat resistant fibers or threads made of heat resistant fibers, are of economic interest. Indeed, an aluminum chunk is resulting from the casting of an aluminum article into a mold, said chunk containing a filter having filtered the liquid metal poured into the mold. This chunk is recovered and then re-melted for recycling purposes. When chunks are liquified, contrary to filters made of steel threads which will gather at the bottom of the melting pots, filters made of heat resistant fibers or threads made of resistant fibers, float on top of the liquid aluminum or aluminum alloys making them very easy to retrieve.

Some attempts were made to embody fabric filters allowing the filtration of liquid metal (e.g. liquid aluminum or aluminum alloys) before being poured into a mold. Fabric made of heat resistant fibers or threads made of heat resistant fibers, are known and they have the fibers (e.g. glass fibers) coated with a sizing material (e.g. starch). Said existing fabric can be made of unwoven fibers (to form a felt of heat resistant fibers), or made of threads of heat resistant fibers, said threads being woven together according to weaving techniques well known to persons skilled in the art. According to the prior art, such fabric can be rigidified by applying thereon a rigidifying material, in order to make it stiff enough to not being deformed by the pressure of a liquid metal passing through its opening, especially liquid aluminum. However, applying a rigidifying material on the sizing material of the heat resistant fibers reveals to provide serious drawbacks that will discourage a person skilled in the art using filters prepared this way.

Applicant's U.S. Pat. No. 6,254,810 relates to a method for coating, protecting and rigidifying a fabric made of heat-resistant fibers. This method comprises the steps of:

a) preparing an aqueous suspension of wollastonite, colloidal silica, sugar and water and having a sufficient viscosity to cover the fibers of the fabric while avoiding free spaces between said fibers, said suspension having a mineral part and an organic part;

b) depositing the suspension prepared in step a) onto the fabric to impregnate the fibers of said fabric, and eliminating any excess of said suspension to avoid obturating the free spaces between the fibers of the fabric;

c) drying the fabric obtained in step b) at a temperature ranging from 130 to 160° C., wherein the temperature is lower than the melting temperature of the sugar;

d) giving a form to the dried fabric obtained in step c) by submitting said fabric to a thermoforming treatment at a softening temperature ranging from 160 to 200° C.; and e) subjecting the thermoformed fabric obtained in step d) to a thermal treatment at a temperature above 200° C. and up to 400° C. in order to convert the organic part of the suspension into polymeric carbon and/or to fully eliminate said organic part.

Also, Applicant's U.S. Pat. No. 6,270,717 relates to a filtration and distribution device for a molten metal. This device is in the form of a bag having parts made of a solid heat-resistant fabric and open areas made of an open weave heat-resistant fabric, wherein at least some of said parts made of said solid heat-resistant fabric are replaced by rigid parts made of a moldable or thermo-formable composite consisting of an open weave heat-resistant fabric embedded into a matrix made of a heat-resistant inorganic material compatible with said open weave heat-resistant fabric and wherein the matrix is prepared from a moldable refractory composition in the form of a slurry which comprises:

from 8 to 25% by weight of an aqueous phosphoric acid solution having a concentration of phosphoric acid ranging from 40 to 85% by weight, said phosphoric acid having up to 50% of its primary acidic functions neutralized by reaction with vermiculite; and from 75 to 92% by weight of a mixture containing wollastonite and an aqueous suspension containing from 20 to 40% by weight of colloidal silica in a weight ratio of said aqueous suspension to said wollastonite ranging from 0.5 to 1.2.

Also, U.S. Pat. No. 8,273,289 relates to a molten metal filter comprising silica cloth coated with a refractory coating including refractory particles and a colloidal silica binder. Preferably the silica cloth is woven. Also, this U.S. Pat. No. 8,273,289 relates to a method of making a molten metal filter comprising: providing a silica cloth filter material; and coating at least a portion of the silica cloth filter material with a refractory coating comprising refractory particles and a colloidal silica binder. Preferably, the method further comprises shaping the silica cloth filter material prior to the coating step.

However, as mentioned above, up to now the presence of coatings shows several drawbacks that would discourage a person skilled in the art to consider using such filters for the filtration of liquid metal such as liquid aluminum or aluminum alloys. Indeed, the coating on the fibers of the resulting fabric shows the drawback of generating a clogging and/or partial obstruction of openings between threads (i.e. reducing the mesh size of the fabric filters). Also, because the protective/rigidifying coating is often brittle, particles may detach therefrom to contaminate the liquid aluminum, especially when applied on the sizing material of the fibers.

Also, existing filtration devices made of a fabric of heat resistant fibers provided with a protective and/or rigidifying coating show several drawbacks that would discourage a person skilled in the art to consider using them for the filtration of liquid metal such as liquid aluminum or aluminum alloys. Indeed, said coating can clog and/or partially obstruct of openings between threads (i.e. thereby reducing the mesh size of the filtration devices).

Also, it is known to use a filtration device made of a fabric of metal threads for the filtration of a liquid metal or an alloy thereof in a low pressure casting process. However, up to now, attempts for the replacement of such filtration devices by filtration devices made of a fabric of rigidified heat resistant fibers (e.g. of glass fibers or silica fibers) failed to be successful.

Indeed, contrary to filtration devices made of a fabric of metal threads, existing filtration devices made of a fabric of rigidified heat resistant fibers or threads of heat resistant fibers, are not stiff enough to prevent being deformed by the pressure of the liquid flowing through them, and therefore they fail to work properly (i.e. to efficiently perform the filtration of the liquid metal or the liquid metal alloy). Furthermore, even if existing filtration devices made of a fabric of rigidified heat resistant fibers can be shaped to have an increased filtration surface, they show the drawbacks of having a meshing that may be partially clogged by the substances used for the rigidification of the fabric (thereby reducing the effective filtration surface of the filtration device).

Also, as mentioned above, when the molded article is removed from the mold, the filtration device remains trapped within a chunk (e.g. a protrusion) of said molded article. This chunk is then removed from the molded article by any appropriate means well known to persons skilled in the art, and re-melted for metal recovery.

However, it is often difficult to efficiently recycle the metal or metal alloy from said chunks. Indeed, filtration devices made of a fabric of metal threads gather at the bottom of the liquid metal or metal alloy (making them hard to recover), and they can partially dissolved into the re-melted metal or metal alloy to contaminate and/or modifying the chemistry of the same. Alternatively, existing filtration devices made of a rigidified fabric of heat resistant fibers gather at the top of the liquid metal or liquid metal alloy (making them easy to recover). An easy and/or rapid recovery of the filtration device is of economical interest.

Heat resistant fibers (such as glass fibers) or threads made of said heat resistant fibers, need to be coated with a sizing material (e.g. starch). Of course, the fabric can be made according to any techniques well known to person skilled in the art. As an example, the fabric can be made of unwoven heat resistant fibers (e.g. forming a felt) or preferably said fabric can be made of woven threads of heat resistant fibers according to weaving techniques well known to persons skilled in the art. However, the presence of sizing material on the fibers, involve that applying a rigidifying material will cause the resulting filters to present aforesaid drawbacks.

Also, existing filtration devices made of metal threads are usually provided with a lower face, an upper face, a peripheral edge, a main portion and optionally a peripheral portion surrounding the main portion. The optional peripheral portion can be shaped to form a convex rim at the lower face of the filtration device, and a concave cavity at the upper face of the filtration device. Said concave cavity is to be oriented toward a filling inlet of the mold of a low pressure casting installation, and said peripheral portion is to be positioned at least in part against a seat portion surrounding an upper opening of a rising tube of the low pressure casting installation. The main portion is to be positioned against a diffuser positioned across the filling inlet of the mold.

However, when such filtrations devices are made of a fabric of woven threads made of heat resistant fiber (e.g. glass fibers), even the application of a protective and/or rigidifying coating on the resulting fabric is inadequate to make them stiff enough to prevent said filtration device to be deformed by the pressure of a liquid, (e.g. liquid aluminum or liquid aluminum alloy) passing there through. Also, because the protecting and/or rigidifying coating provided onto said fabric can partially disintegrate during the filtration of the liquid, then a contamination of said liquid metal or liquid metal alloy can occur.

Also, because the protecting coating provided onto said fabric can partially distintegrate during the filtration of the liquid metal or the liquid metal alloy, then a contamination of said liquid metal or liquid metal alloy can occur.

Also, handling of a filter or filtration device may be difficult to incorporate into an automated and robotized process. Indeed, filter are usually placed across the inlet of the cavity of the mold manually with a tool grasping them.

Therefore, there is a strong need in the industry for a fabric filters allowing the filtration of liquid metal, such as liquid aluminum or liquid aluminum alloys, before the step of pouring said liquid metal into a mold, and without having the drawbacks associated with the previous attempts to make such fabric filters.

Also, there is a strong need for a new filtration device made of a fabric of rigidified heat resistant fibers or threads of heat resistant fibers, allowing an easy and/or rapid recovery of the of the same from liquid metal resulting from chunks of metal obtained from molded articles, thereby defining an economical advantage over existing filters.

Also, there is a strong need for a new filtration device made of a fabric of rigidified heat resistant fibers or made of threads of heat resistant fibers, wherein the above-mentioned drawbacks are avoided and/or minimized. Also, there is a strong need for a new filtration device preventing to reduce its filtration surface by reduction of the size of the openings, and optionally allowing to increase said filtration surface by modifying its shape and/or allowing a faster priming of the same.

Also, there is a strong need for a new filtration device as defined hereinabove that can be easily handled by a tool provided with a magnet, preferably with such a tool mounted on a robotized apparatus in an automated low pressure casting process.

Also, there is a strong need for a method for the manufacture of the new filtration device defined hereinabove, and the filtration device so obtained.

Also, there is a strong need for a low pressure casting process, especially an automated low pressure casting process, where a filtration device made of a fabric of rigidified heat resistant fibers (e.g. of glass fibers or silica fibers) or threads of said heat resistant fibers, as defined hereinabove can be used with success for the filtration of a liquid metal or an alloy thereof during the casing of an article into a mold, especially in an automated low pressure casting installation.

Also, there is a strong need for a low pressure casting installation, especially an automated low pressure casting installation, where a filtration device is as defined hereinabove, for the filtration of a liquid metal or an alloy thereof during the casing of an article into a mold.

Also, there is a strong need for a use of a filtration device made of a fabric of rigidified heat resistant fibers (e.g. of glass fibers or silica fibers) or threads of said heat resistant fibers, as defined hereinabove for the filtration of a liquid metal or an alloy thereof during the low pressure casing of an article into a mold in a low pressure casting installation, especially in an automated low pressure casting installation.

Also, there is a strong need in the metallurgic industry for a filtration device made of a fabric of heat resistant fibers or threads of said heat resistant fibers, allowing the filtration of a liquid metal or an alloy thereof, such as liquid aluminum or liquid aluminum alloys, before the step of filling a mold in a low pressure casting installation, without having the drawbacks associated with existing filtration devices.

The Applicant has now discovered various embodiments overcoming numerous drawbacks associated with existing fabric filters. More particularly, it is worth mentioning that amongst aforesaid numerous advantages, said fabric filters according to the invention are rigidified by preventing the sliding of fibers and/or threads on each other, preventing partial obstruction of the meshing, and/or preventing contamination the filtered liquid metal (e.g. liquid aluminum or aluminum alloys), while being as efficient as corresponding existing filters, such as filters made of metal threads.

Also, the Applicant has discovered various embodiments which overcome drawbacks associated with said existing filtration devices made of a fabric of rigidified heat resistant fibers and/or threads of heat resistant fibers. More particularly, it is worth mentioning amongst said numerous advantages, that said filtration device according to the invention prevents being deformed by the flow of liquid passing there through, prevents partial obstruction of the meshing, prevents contamination of the filtered liquid metal or liquid metal alloy (e.g. liquid aluminum or aluminum alloy), and/or optionally allows an easy handling by a tool provided with a magnet (especially a robotized arm provided with said tool), while being as efficient as corresponding existing filters, such as filters made of metal threads.

Also, the Applicant has surprisingly discovered that it was possible to overcome drawbacks associated with filtering devices made of a fabric of metal threads or made of fabric of heat resistant fibers, when using a filtration device made of a fabric or rigidified heat resistant fibers, having a particular structural shape and orientation. In particular, the Applicant has surprisingly discovered that when positioning upside down certain filtration devices made of a fabric of rigidified heat resistant fibers, it is possible to avoid the drawback of having the filtration devices deformed by the pressure of the liquid (e.g. a liquid metal or a liquid metal alloy) passing there through.

More particularly, the Applicant has surprisingly discovered aforesaid unexpected advantages concerning a preferred filtration device comprising:

- a lower face, an upper face, a peripheral edge, a main portion, and a peripheral portion surrounding the main portion,
- the main portion and a part of the peripheral portion being to be positioned across an upper opening of a riser tube of a low pressure casting installation,
- the main portion being to be positioned against a diffuser positioned across the filling inlet of a mold of the low pressure casting installation;
- the peripheral portion being shaped to form a convex rim at the upper face and a concave cavity at the lower face, said concave cavity being to be oriented toward the upper opening, and the peripheral edge being to be positioned against a seat portion of the rising tube surrounding the upper opening. Indeed, said filtration device can be made of heat resistant fibers or threads of heat resistant fibers, rather than metallic threads. As a non-limitative example, this contributes to lower the costs and ease the recovery of used filtration devices.

More particularly, the Applicant has surprisingly discovered aforesaid unexpected advantages concerning a preferred filtration provided with a pair of baskets forming a filtration body with an hollowed cavity, said cavity being optionally further provided with a filtration pad, said filtration body having

- having a structural shape and orientation and being provided with a closed cavity, an upper face, a lower face, and a side face,
- a main portion and the lower face of the filtration body has a peripheral portion,
- the main portion of the filtration body is for positioning against a diffuser positioned across a filling inlet of a mold of the low pressure casting installation;
- said peripheral portion is for positioning across an upper opening of a rising tube of the low pressure casting installation, the peripheral portion being to be oriented toward the upper opening of the riser tube and for positioning against a seat portion of the rising tube surrounding the upper opening. Indeed, said filtration device can be made of heat resistant fibers or threads of heat resistant fibers, rather than metallic threads. As a non-limitative example, this contributes to lower the costs and ease the recovery of used filtration devices.

SUMMARY OF THE INVENTION

An embodiment of the invention relates to a composition for preparing a rigidified fabric made of heat resistant fibers or threads of heat resistant fibers, preferably of woven threads made of heat resistant fibers, said composition comprising a mixture of a product A and a product B:
- the product A being obtained by polymerisation of carbohydrate units, natural or synthetic, preferably a saccharide, and more preferably a sugar such as glucose, fructose, galactose, sucrose, maltose, lactose, etc.; and
- the product B consisting of at least one additive such as a binding agent.

An embodiment of the invention relates to a composition for preparing a rigidified fabric made of heat resistant fibers or threads of heat resistant fibers, preferably of woven threads made of heat resistant fibers, said composition comprising a mixture of a product A and a product B;
- the product A being obtained by caramelization of a mixture M comprising:
  - sucrose,
  - water, and
  - optionally at least one additive; and
- the product B consisting of at least one inorganic colloidal binding agent.

Another embodiment of the invention relates to a method for preparing a composition for the manufacture of a rigidified fabric made of heat resistant fibers or made of threads made of heat resistant fibers, said composition comprising a mixture of a product A and a product B:
- the product A being obtained by polymerisation of carbohydrate units, natural or synthetic, preferably a saccharide, and more preferably a sugar such as glucose, fructose, galactose, sucrose, maltose, lactose, etc.; and
- the product B consisting of at least one additive such as a binding agent;

said method comprising the steps of:
- polymerizing the carbohydrate units to obtained a polymerized carbohydrate, and
- mixing the product A with the product B.

Another embodiment of the invention relates to a method for preparing a composition for the manufacture of a rigidified fabric made of heat resistant fibers or made of threads made of heat resistant fibers, said composition being a mixture comprising a product A and a product B; the product A being obtained by caramelization of a mixture M comprising sucrose, water, and optionally at least one additive; and the product B consisting of at least one inorganic colloidal binding agent, said method comprising the steps of:
- heating the mixture M comprising sucrose, water, and optionally the at least one additive; to carry out a caramelization of said mixture M, and then cooling it to obtain the product A; and
- mixing the product A with the product B.

Another embodiment of the invention relates to a method for the preparation of a rigidified fabric made of heat resistant fibers or made of threads of heat resistant fibers, said method comprising the steps of:
a) impregnating a fabric made of heat resistant fibers or made threads of heat resistant fibers, said heat resistant fibers or heat resistant fibers of the threads being substantially free of one or more sizing agents consisting of organic polymers, with a composition as defined hereinabove, to obtain a fabric impregnated with said composition;
b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;
c) optionally forming the fabric obtained from step b) into a desired shape and optionally allowing the fabric so obtained to cool; and
d) subjecting the fabric impregnated with the composition, as obtained from step b) or c), to a thermosetting treatment by heating it to a thermosetting temperature to thermoset the thermoplastic composition impregnated in the fabric in order to rigidify the fabric by cross-linking of the heat resistant fibers or the heat resistant fibers of the threads.

Another embodiment of the invention relates to a method for the preparation of a thermoplastic, rigidified fabric made of heat resistant fibers or made of threads of heat resistant fibers, said method comprising the steps of:
a) impregnating a fabric made of heat resistant fibers or made of threads of heat resistant fibers, said heat resistant fibers or heat resistant fibers of the threads being substantially free of one or more sizing agents consisting of organic polymers, with a composition as defined hereinabove, to obtain a fabric impregnated with said composition;
b)—subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool; and
c) optionally forming the fabric obtained from step b) into a desired shape to form a shaped fabric, and optionally allowing the shaped fabric to cool;

said thermoplastic fabric obtained from step b) or c) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

Another embodiment of the invention relates to a thermoplastic fabric made of heat resistant fibers or made of threads of heat resistant fibers, wherein said thermoplastic fabric is obtained from said method defined hereinabove for the preparation of a thermoplastic, rigidified fabric made heat resistant fibers or threads of heat resistant fibers.

Another embodiment of the invention relates to a method for preparing a rigidified fabric made of heat resistant fibers or made of threads of heat resistant fibers, said method comprising the step of subjecting the thermoplastic fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

Another embodiment of the invention relates to a rigidified fabric made of heat resistant fibers or made of threads of heat resistant fibers, wherein said rigidified fabric is obtained from any one of the methods defined hereinabove for obtaining said rigidified fabric according to the invention.

Another embodiment of the invention relates to a filtration device for the filtering of a liquid metal or an alloy thereof, wherein said filtration device is made of a rigidified fabric as defined hereinabove, said fabric being made of heat resistant fibers or made of threads of heat resistant fibers.

Another embodiment of the invention relates to an installation for the filtering of a liquid metal or alloy thereof, said installation comprising:
- a reservoir containing the liquid metal or the alloy thereof;
- a mold provided with a cavity, a filing inlet and a diffuser mounted across the filling inlet;
- the filtration device;
- a rising tube having
  - a lower end provided with a lower opening immerged into the liquid metal or the alloy thereof contained in the reservoir,
  - an upper end provided with an upper opening connectable with the filing inlet of the mold and provided with a seat portion surrounding the upper opening, and
  - a rising channel connecting the lower opening and the upper opening, in order to place the reservoir and the inlet of the mold in fluid communication when the upper opening is connected with the filing inlet, and the filtration device contacted by the diffuser; and
- means for the displacement of an amount of the liquid metal or the alloy thereof contained in the reservoir, through the rising channel of the rising tube, the filtration device, and the filling inlet to fill the cavity;

wherein said filtration device is made of at least one ply of a fabric of rigidified heat resistant fibers as defined hereinabove.

Another embodiment of the invention relates to a process for the filtration of a liquid metal or an alloy thereof, said process comprising:
- a reservoir containing the liquid metal or the alloy thereof;
- a mold provided with a cavity, a filing inlet and a diffuser mounted across the filling inlet;
- the filtration device;
- a rising tube having
  - a lower end provided with a lower opening immerged into the liquid metal or the alloy thereof contained in the reservoir,
  - an upper end provided with an upper opening connectable with the filing inlet of the mold and provided with a seat portion surrounding the upper opening, and
  - a rising channel connecting the lower opening and the upper opening, in order to place the reservoir and the inlet of the mold in fluid communication when the upper opening is connected with the filing inlet, and the filtration device contacted by the diffuser; and
- means for the displacement of an amount of the liquid metal or the alloy thereof contained in the reservoir, through the rising channel of the rising tube, the filtration device, and the filling inlet to fill the cavity;

said process comprising a step of filtering the liquid metal or the alloy thereof through filtration device, said filtration device being as defined hereinabove.

Another embodiment of the invention relates to a use of the filtration device as defined hereinabove, for the filtration of a liquid metal or an alloy thereof.

Another embodiment of the invention relates to a first preferred variant of a filtration device for the filtration of a liquid metal or an alloy thereof in a low pressure casting process useful for the formation a molded article in a low pressure casting installation,
wherein said filtration device is made of at least one ply of a rigidified fabric made of heat resistant fibers or made of threads of heat resistant fibers, as defined hereinabove,
wherein said filtration device has a structural shape and orientation and comprises a lower face, an upper face, a peripheral edge, a main portion, and a peripheral portion surrounding the main portion,
wherein the main portion and a part of the peripheral portion are for positioning across an upper opening of a rising tube of the low pressure casting installation,
wherein the main portion is for positioning against a diffuser positioned across a filling inlet of a mold of the low pressure casting installation;
wherein the peripheral portion is shaped to form a convex rim at the upper face and a concave cavity at the lower face, said concave cavity orientation being to be oriented toward the upper opening of the riser tube, and
wherein the peripheral edge is for positioning against a seat portion of the rising tube surrounding the upper opening.

Another embodiment of the invention relates to a second preferred variant of a filtration device for the filtration of a liquid metal or an alloy thereof in a low pressure casting process useful for the formation a molded article in a low pressure casting installation,
wherein said filtration device is made of at least one ply of a rigidified fabric made of heat resistant fibers or made of threads of heat resistant fibers, as defined hereinabove,
wherein said filtration device has a structural shape and orientation and comprises a lower face, an upper face, a peripheral edge, a main portion, and a peripheral portion surrounding the main portion,
wherein the main portion and a part of the peripheral portion are for positioning across an upper opening of a rising tube of the low pressure casting installation,
wherein the main portion is for positioning against a diffuser positioned across a filling inlet of a mold of the low pressure casting installation;
wherein the peripheral portion is shaped to form a convex rim at the upper face and a concave cavity at the lower face, said concave cavity orientation being to be oriented toward the upper opening of the riser tube, wherein the main portion is a dome having its summit oriented toward the upper opening, and the upper face of said main portion is contacted by the diffuser, and wherein the peripheral edge is for positioning against a seat portion of the rising tube surrounding the upper opening.

Another embodiment of the invention relates to a first preferred method for the preparation of the first variant or the second variant of the filtration device defined hereinabove, said filtration device being made of a rigidified fabric made of heat resistant fibers or made of threads of heat resistant fibers, said method comprising the steps of:
a) impregnating a fabric made of heat resistant fibers or made threads of heat resistant fibers, said heat resistant fibers or heat resistant fibers of the threads being substantially free of one or more sizing agents consisting of organic polymers, with a composition as defined hereinabove, to obtain a fabric impregnated with said composition;
b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;
c) forming the fabric obtained from step b) into the shape of the aforesaid first or second variant of the filtration device, and optionally allowing the fabric so obtained to cool, said forming of the fabric obtained from step b) into a desired shape is carried out by moulding, optionally with heating and/or pressure; and
d) subjecting the fabric impregnated with the composition, as obtained from step b) or c), to a thermosetting treatment by heating it to a thermosetting temperature to thermoset the thermoplastic composition impregnated in the fabric in order to rigidify the fabric by cross-linking of the heat resistant fibers or the heat resistant fibers of the threads.

Another embodiment of the invention relates to a second preferred method method for the preparation of a rigidified fabric made of heat resistant fibers or made of threads of heat resistant fibers, said method comprising the steps of:
a) impregnating a fabric made of heat resistant fibers or made of threads of heat resistant fibers, said heat resistant fibers or heat resistant fibers of the threads being substantially free of one or more sizing agents consisting of organic polymers, with a composition as defined hereinabove, to obtain a fabric impregnated with said composition;
b)—subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool; and
c) forming the fabric obtained from step b) into a shape of the aforesaid first or second variant of the filtration device, said forming of the thermoplastic fabric into a desired shape is carried out by moulding, optionally with heating and/or pressure, and optionally allowing the shaped fabric to cool;
said fabric obtained from step b) or c) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

Another embodiment of the invention relates to a third preferred method for preparing a rigidified fabric made of heat resistant fibers or made of threads of heat resistant fibers, said method comprising the step of subjecting the thermoplastic fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

Another embodiment of the invention relates to a third variant of a filtration device for the filtration of a liquid metal or an alloy thereof in a low pressure casting process useful for the formation a molded article in a low pressure casting installation, wherein said filtration device is made of a first basket and a second basket, each of said baskets being made of at least one ply of a rigidified fabric made of heat resistant fibers or made of threads of heat resistant fibers, as defined hereinabove, wherein the first basket has an outer wall and a cavity defined by an inner wall, an end wall and an opening opposite to the end wall, wherein the second basket has an outer wall and a cavity defined by an inner wall, an end wall and an opening opposite to the end wall, wherein the opened end of the first basket is housed within the cavity of the second basket to define a filtration body having a structural shape and orientation and being provided with a cavity, an upper face, a lower face, and a side face, wherein the end wall of the first basket corresponds to the upper face of the filtration body, and the end wall of the second basket corresponds to the lower face of the filtration body, wherein when the outer wall of the first basket is sized to be friction fit against the inner wall of the second basket, the outer wall of the second basket corresponds at least in part to the side face of the filtration body, or when the outer wall of the second basket is sized to be friction fit against the inner wall of the first basket, the outer wall of the first basket corresponds at least in part to the side face of the filtration body, wherein upper face of the filtration body has a main portion and the lower face of the filtration body has a peripheral portion, wherein the main portion of the filtration body is for positioning against a diffuser positioned across a filling inlet of a mold of the low pressure casting installation;

wherein said peripheral portion is for positioning across an upper opening of a rising tube of the low pressure casting installation, said peripheral portion being to be oriented toward the upper opening of the riser tube and for positioning against a seat portion of the rising tube surrounding the upper opening.

Another embodiment of the invention relates to a fourth variant of a filtration device for the filtration of a liquid metal or an alloy thereof in a low pressure casting process useful for the formation a molded article in a low pressure casting installation, wherein said low pressure casting installation comprises:
    a reservoir containing the liquid metal or the alloy thereof;
    a mold provided with a cavity, a filing inlet and a diffuser mounted across the filling inlet;
    the filtration device;

a rising tube having
   a lower end provided with a lower opening immerged into the liquid metal or the alloy thereof contained in the reservoir,
   an upper end provided with an upper opening connectable with the filing inlet of the mold and provided with a seat portion surrounding the upper opening, and
   a rising channel connecting the lower opening and the upper opening, in order to place the reservoir and the inlet of the mold in fluid communication when the upper opening is connected with the filing inlet, and the filtration device contacted by the diffuser; and
means for the displacement of an amount of the liquid metal or the alloy thereof contained in the reservoir, through the rising channel of the rising tube, the filtration device, and the filling inlet to fill the cavity;
wherein said filtration device is made of a first basket and a second basket, each of said baskets being made of at least one ply of a rigidified fabric made of heat resistant fibers or made of threads of heat resistant fibers, as defined hereinabove,
wherein the first basket has an outer wall and a cavity defined by an inner wall, an end wall and an opening opposite to the end wall,
wherein the second basket has an outer wall and a cavity defined by an inner wall, an end wall and an opening opposite to the end wall,
wherein the opened end of the first basket is housed within the cavity of the second basket to define a filtration body having a structural shape and orientation and being provided with a cavity, an upper face, a lower face, and a side face,
wherein a filtration pad is housed within the cavity of the filtration body;
wherein the end wall of the first basket corresponds to the upper face of the filtration body, and the end wall of the second basket corresponds to the lower face of the filtration body,
wherein when the outer wall of the first basket is sized to be friction fit against the inner wall of the second basket, the outer wall of the second basket corresponds at least in part to the side face of the filtration body, or when the outer wall of the second basket is sized to be friction fit against the inner wall of the first basket, the outer wall of the first basket corresponds at least in part to the side face of the filtration body,
wherein a main portion and a peripheral portion of the filtration body are for positioning across the upper opening of the rising tube of the low pressure casting installation,
upper face of the filtration body has a main portion and the lower face of the filtration body has a peripheral portion,
wherein the main portion of the filtration body is for positioning against a diffuser positioned across a filling inlet of a mold of the low pressure casting installation;
wherein said peripheral portion is for positioning across an upper opening of a rising tube of the low pressure casting installation, said peripheral portion being to be oriented toward the upper opening of the riser tube and for positioning against a seat portion of the rising tube surrounding the upper opening.

Another embodiment of the invention relates to a fourth preferred method for the preparation of the third or second variant of the filtration device defined hereinabove, said filtration device being made of a rigidified fabric made of heat resistant fibers or made of threads of heat resistant fibers, said method comprising the steps of:

a) impregnating a fabric made of heat resistant fibers or made threads of heat resistant fibers, said heat resistant fibers or heat resistant fibers of the threads being substantially free of one or more sizing agents consisting of organic polymers, with a composition as defined hereinabove, to obtain a fabric impregnated with said composition;

b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;

c) forming the fabric obtained from step b) into the shape of the first basket of the aforesaid third or fourth variant of the filtration device, and optionally allowing the fabric so obtained to cool, said forming being carried out by moulding, optionally with heating and/or pressure; forming the fabric obtained from step b) into the shape of the second basket of the aforesaid third or fourth variant of the filtration device, and optionally allowing the fabric so obtained to cool, said forming being carried out by moulding, optionally with heating and/or pressure d) assembling the first basket and the second basket to form a filtration body, optionally with a pad of a felt of heat resistant fiber within the filtration body, and d) subjecting the filtration body as obtained from step d) to a thermosetting treatment, optionally in a mold, by heating it to a thermosetting temperature to thermoset the thermoplastic composition impregnated in the fabric in order to rigidify the fabric by cross-linking of the heat resistant fibers or the heat resistant fibers of the threads.

Another embodiment of the invention relates to a fifth preferred method for the preparation of a rigidified fabric made of heat resistant fibers or made of threads of heat resistant fibers, said method comprising the steps of:

a) impregnating a fabric made of heat resistant fibers or made of threads of heat resistant fibers, said heat resistant fibers or heat resistant fibers of the threads being substantially free of one or more sizing agents consisting of organic polymers, with a composition as defined hereinabove, to obtain a fabric impregnated with said composition;

b)—subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool;

c) forming the fabric obtained from step b) into a shape of the aforesaid first basket and the second basket of the third variant of the filtration device, said forming of the thermoplastic fabric into a desired shape is carried out by moulding, optionally with heating and/or pressure, and optionally allowing the shaped fabric to cool;

d) assembling the first basket and the second basket to form a filtration body, optionally with a pad of heat resistant fiber within the filtration body;

said fabric obtained from step d) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

Another embodiment of the invention relates to a sixth preferred method for preparing a rigidified fabric made of heat resistant fibers or made of threads of heat resistant fibers, said method comprising the step of subjecting the thermosettable fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

Another embodiment of the invention relates to an installation for the filtration of a liquid metal or an alloy thereof in a low pressure casting process useful for the formation a molded article in a low pressure casting installation, wherein said low pressure casting installation comprises:
- a reservoir containing the liquid metal or the alloy thereof;
- a mold provided with a cavity, a filing inlet and a diffuser mounted across the filling inlet;
- the filtration device defined hereinabove according to the invention;
- a rising tube having
  - a lower end provided with a lower opening immerged into the liquid metal or the alloy thereof contained in the reservoir,
  - an upper end provided with an upper opening connectable with the filing inlet of the mold and provided with a seat portion surrounding the upper opening, and
  - a rising channel connecting the lower opening and the upper opening, in order to place the reservoir and the inlet of the mold in fluid communication when the upper opening is connected with the filing inlet, and the filtration device contacted by the diffuser; and
- means for the displacement of an amount of the liquid metal or the alloy thereof contained in the reservoir, through the rising channel of the rising tube, the filtration device, and the filling inlet to fill the cavity;
wherein said filtration device is made of at least one ply of a rigidified fabric made of heat resistant fibers or threads of heat resistant fibers, as defined hereinabove.
wherein said filtration device is as defined hereinabove.

Another embodiment of the invention relates to a process for the filtration of a liquid metal or an alloy thereof in a low pressure casting process useful for the formation a molded article in a low pressure casting installation, wherein said low pressure casting installation comprises:
- a reservoir containing the liquid metal or the alloy thereof;
- a mold provided with a cavity, a filing inlet and a diffuser mounted across the filling inlet;
- the filtration device defined hereinabove according to the invention;
- a rising tube having
  - a lower end provided with a lower opening immerged into the liquid metal or the alloy thereof contained in the reservoir,
  - an upper end provided with an upper opening connectable with the filing inlet of the mold and provided with a seat portion surrounding the upper opening, and
  - a rising channel connecting the lower opening and the upper opening, in order to place the reservoir and the inlet of the mold in fluid communication when the upper opening is connected with the filing inlet, and the filtration device contacted by the diffuser; and
- means for the displacement of an amount of the liquid metal or the alloy thereof contained in the reservoir, through the rising channel of the rising tube, the filtration device, and the filling inlet to fill the cavity;
wherein said filtration device is made of at least one ply of a rigidified fabric made of heat resistant fibers or threads of heat resistant fibers, as defined hereinabove.

Another embodiment of the invention relates to a use of the filtration device defined hereinabove, for the filtration of a liquid metal or an alloy thereof in a low pressure casting process useful for the formation a molded article in a low pressure casting installation, wherein said low pressure casting installation comprises:
- a reservoir containing the liquid metal or the alloy thereof;
- a mold provided with a cavity, a filing inlet and a diffuser mounted across the filling inlet;
- the filtration device defined hereinabove according to the invention;
- a rising tube having
  - a lower end provided with a lower opening immerged into the liquid metal or the alloy thereof contained in the reservoir,
  - an upper end provided with an upper opening connectable with the filing inlet of the mold and provided with a seat portion surrounding the upper opening, and
  - a rising channel connecting the lower opening and the upper opening, in order to place the reservoir and the inlet of the mold in fluid communication when the upper opening is connected with the filing inlet, and the filtration device contacted by the diffuser; and
- means for the displacement of an amount of the liquid metal or the alloy thereof contained in the reservoir, through the rising channel of the rising tube, the filtration device, and the filling inlet to fill the cavity;
wherein said filtration device is made of at least one ply of a rigidified fabric made of heat resistant fibers or threads of heat resistant fibers, as defined hereinabove.

According to a very referred aspect of the invention, the fabric of glass fiber that can be used as a starting material to embody the various preferred embodiments of the invention are fabrics made of threads of glass fibers coated with starch. More particularly, said fabric may be selected amongst those listed in the following table:

| Fiberglass filtration product - with starch coating Specification table (metric values) | | | | | | |
|---|---|---|---|---|---|---|
| Style | Thread Diameter | Thread Count | Holes | Opening Sizes | Open | Weave |
| Number | Warp mm  Fill mm | Per cm$^2$ | Per cm$^2$ | Per cm$^2$ | area % | Type |
| 34L | 0.864    0.940 | 34.3 × 29 | 10 | 0.0512 | 50.9 | Leno |
| 34P4 | 0.787    1.016 | 37.3 × 31 | 12 | 0.0418 | 48.4 | Plain |
| 36F | 0.686    1.118 | 40.9 × 34 | 14 | 0.0321 | 44.6 | Plain |

-continued

Fiberglass filtration product - with starch coating
Specification table (metric values)

| Style Number | Thread Diameter Warp mm | Fill mm | Thread Count Per cm² | Holes Per cm² | Opening Sizes Per cm² | Open area % | Weave Type |
|---|---|---|---|---|---|---|---|
| 36L | 0.914 | 0.864 | 38.4 × 36 | 14 | 0.0322 | 44.5 | Leno |
| 36P | 0.686 | 0.838 | 40.9 × 37.8 | 15 | 0.0315 | 48.7 | Plain |
| 36P4 | 0.787 | 1.067 | 37.3 × 41 | 15 | 0.0260 | 39.7 | Plain |
| 40F | 0.686 | 1.118 | 40.9 × 37.8 | 15 | 0.0269 | 41.6 | Plain |
| 40L | 0.940 | 0.864 | 43.8 × 36 | 16 | 0.0255 | 40.3 | Leno |
| 40P | 0.686 | 0.838 | 44.9 × 44.4 | 20 | 0.0218 | 43.5 | Plain |
| 40P4 | 0.813 | 0.991 | 36.8 × 34.1 | 13 | 0.0368 | 46.3 | Plain |
| 42F | 0.762 | 1.118 | 44.9 × 38 | 17 | 0.0222 | 37.8 | Plain |
| 42P | 0.737 | 0.864 | 44.9 × 46.5 | 21 | 0.0191 | 40.1 | Plain |
| 43FK | 0.762 | 1.118 | 54 × 42 | 23 | 0.0138 | 31.2 | Plain |
| 43P | 0.737 | 1.864 | 54 × 50.6 | 27 | 0.0124 | 33.9 | Plain |
| 43P4 | 0.889 | 1.168 | 54 × 47 | 25 | 0.0092 | 24.3 | Plain |
| 55F | 0.533 | 0.787 | 65.8 × 56.9 | 37 | 0.0095 | 35.9 | Plain |

More particularly, the product 40L mentioned hereinabove is particularly preferred as starting material for embodying the various preferred embodiments of the invention.

The invention and its advantages will be better understood upon reading the following non-restrictive detailed description thereof.

DETAILED DESCRIPTION OF PREFERRED EMBODIMENTS OF THE INVENTION

As mentioned above, an embodiment of the invention relates to a composition for preparing a rigidified fabric made of heat resistant fibers or threads of heat resistant fibers, said heat resistant fibers being glass fibers, silica fibers or a mixture thereof, said composition comprising a mixture of a product A and a product B:
 the product A being obtained by polymerisation of saccharide units; and
 the product B consisting of at least one inorganic colloidal binding agent.

According to another embodiment the invention relates to the composition defined hereinabove, wherein the rigidified fabric is made of woven threads made of glass fibers, silica fibers or a mixture thereof.

According to another embodiment the invention relates to the composition defined hereinabove, wherein the saccharide units are selected from the group consisting of glucose, fructose, galactose, sucrose, maltose and lactose.

As mentioned above, another embodiment of the invention relates to a composition for preparing a rigidified fabric made of heat resistant fibers or made of threads of heat resistant fibers, said heat resistant fibers being glass fibers, silica fibers or a mixture thereof, said composition comprising a mixture of a product A and a product B; the product A being obtained by caramelization of a mixture M comprising: sucrose, water, and optionally at least one additive selected from the group consisting of acids, inorganic wetting agents and acid phosphate adhesives; and the product B consisting of at least one inorganic colloidal binding agent. Preferably, the rigidified fabric is made of woven threads of glass fibers, silica fibers or a mixture thereof.

According to another embodiment the invention relates to the composition defined hereinabove, wherein the sucrose may be of any kind commonly used to make a «caramel».

Preferably, the sucrose is a food-grade, refined and granulated sucrose (e.g. table sugar).

According to another embodiment of the invention relates to the composition defined hereinabove, wherein the water may consist of any kind of water allowing to make a «caramel», including tap water, distilled water, demineralized water, etc. Preferably, the water is tap water.

According to another embodiment of the invention, the acid may be phosphoric acid, sulfuric acid, citric acid, acetic acid or a mixture of at least two of them. Preferably, the acid may be phosphoric acid.

According to another embodiment of the invention, the inorganic wetting agent may be aluminum ammonium sulfate, magnesium sulfate, aluminum sulfate, calcium sulfate or a mixture of at least two of them. Preferably, the inorganic wetting agent may be aluminum ammonium sulfate.

According to another embodiment of the invention, the acid phosphate adhesive may be calcium phosphate, magnesium phosphate, aluminum sulfate or a mixture of at least two of them. Preferably the acid phosphate adhesive may be calcium phosphate.

According to another embodiment of the invention, the at least one inorganic colloidal binding agent may consist of a colloidal silica, a colloidal alumina, a colloidal zirconia or a mixture of at least two of them. Preferably said at least one inorganic colloidal binding agent is a colloidal silica. More preferably, said at least one inorganic colloidal binding agent may consist of colloidal silica dioxide, such as for example a colloidal silica dioxide which is a colloidal dispersion of submicron-sized silica particles in the form of tiny spheres, in an alkaline aqueous solution. Much more preferably, the inorganic colloidal binding agent is a colloidal dispersion of submicron-sized silica particles in the form of tiny spheres, in an alkaline aqueous solution and sold under the trademark NALCO 1144®. Said NALCO 1144® has the following properties:

| | |
|---|---|
| Colloidal Silica as $SiO_2$: | 40%, |
| pH @ 25° C.: | 9.9, |
| Average particle Diameter: | 14 nm, |
| Specific Gravity: | 1.30, |
| Viscosity: | 15 cP, and |
| $Na_2O$ | 0.45%. |

According to another embodiment the invention relates to the composition defined hereinabove, wherein the mixture M comprises:

- 30 wt % to 70 wt %, preferably about 55.0 wt. %, of sucrose;
- 70 wt. % to 30 wt. %, preferably about 41.5 wt. %, of water;
- 0 wt. % to 1.8 wt. %, preferably about 1.1 wt. %, of phosphoric acid;
- 0 wt. % to 1.7 wt. %, preferably about 1.0 wt. %, of aluminum ammonium sulfate; and
- 0 wt % to 2.0 wt %, preferably about 1.4 wt. %, of calcium phosphate monobasic.

Another embodiment of the invention relates to the composition defined hereinabove, wherein phosphoric acid originates from a mixture of 75 wt % $H_3PO_4$ and 25 wt % water, the amount of water being part of the total amount of water of the composition, the aluminium ammonium sulfate is $AlNH_4(SO_4)_2.2H_2O$, and the calcium phosphate monobasic is $Ca(H_2PO_4)_2.2H_2O$.

According to another embodiment the invention relates to the composition defined hereinabove, wherein said composition comprises from 50 wt. % to 85 wt. % of the product A and from 15 wt. % to 50 wt. % of the product B. Preferably, said composition may comprise about 66 wt. % of the product A and about 34 wt. % of the product B.

According to another embodiment the invention relates to the composition defined hereinabove, wherein the caramelization is carried out by heating the mixture M at a boiling temperature, preferably between 100° C. and 105° C., more preferably between 100° C. and 103° C., for a period of time varying from 5 to 10 minutes, preferably about 5 minutes, and then allowing the resulting product A to cool.

According to another embodiment the invention relates to the composition defined hereinabove, wherein the at least one inorganic colloidal binding agent is added to the product A by mixing.

Another embodiment of the invention relates to the composition defined hereinabove, wherein the rigidified fabric is made of threads of heat resistant fibers selected from the group consisting of acids, inorganic wetting agents and acid phosphate adhesives, said threads having a diameter varying from 0.864 mm to 0.533 mm, and the fabric having a meshing varying from 0.94 mm to 0.255 mm, and from 50.9% to 35.9% of openings with respect to the total surface of the fabric.

Another embodiment of the invention relates to the composition defined hereinabove, wherein the heat resistant fibers (including heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

As mentioned hereinabove, another embodiment of the invention relates to a method for preparing a composition for the manufacture of a rigidified fabric made of heat resistant fibers or made of threads made of heat resistant fibers selected from the group consisting of acids, inorganic wetting agents and acid phosphate adhesives, said composition comprising a mixture of a product A and a product B:

- the product A being obtained by polymerisation of saccharide units; and
- the product B consisting of at least one inorganic colloidal binding agent;

said method comprising the steps of:
- polymerizing the saccharide units to obtained a polymerized saccharide, and
- mixing the product A with the product B.

According to another embodiment the invention relates to the method defined hereinabove, wherein the rigidified fabric is made of woven threads made of glass fibers, silica fibers or a mixture thereof.

According to another embodiment the invention relates to the method defined hereinabove, wherein the saccharide units are selected from the group consisting of glucose, fructose, galactose, sucrose, maltose and lactose.

As mentioned hereinabove, another embodiment of the invention relates to a method for preparing the composition for the manufacture of a rigidified fabric made of heat resistant fibers or made of threads made of heat resistant fibers, said heat resistant fibers being glass fibers, silica fibers or a mixture thereof, said composition being a mixture comprising a product A and a product B; the product A being obtained by caramelization of a mixture M comprising sucrose, water, and optionally at least one additive selected from the group consisting of acids, inorganic wetting agents and acid phosphate adhesives; and the product B consisting of at least one inorganic colloidal binding agent, said method comprising the steps of:

- heating the mixture M comprising sucrose, water, and optionally the at least one additive selected from the group consisting of acids, inorganic wetting agents and acid phosphate adhesives; to carry out the caramelization of said mixture M, and then cooling it to obtain the product A; and
- mixing the product A with the product B.

According to another embodiment of the invention, in the method defined hereinabove, the sucrose may consist of any kind commonly used to make a «caramel». Preferably, the sucrose is a food-grade, refined and granulated sucrose (e.g. table sugar).

According to another embodiment of the invention, in the method defined hereinabove, the water may consist of any kind of water allowing to make a «caramel», including tap water, distilled water, demineralized water, etc. Preferably, the water is tap water.

According to another embodiment of the invention, in the method defined hereinabove, the at least one inorganic colloidal binding agent may consist of a colloidal silica, a colloidal alumina, a colloidal zirconia or a mixture of at least two of them. Preferably, the at least one inorganic colloidal binding agent may be a colloidal silica. More preferably, said at least one inorganic colloidal binding agent may consist of colloidal silica dioxide, such as for example a colloidal silica dioxide which is a colloidal dispersion of submicron-sized silica particles in the form of tiny spheres, in an alkaline aqueous solution. Much more preferably, the inorganic colloidal binding agent may consist of a colloidal dispersion of submicron-sized silica particles in the form of tiny spheres, in an alkaline aqueous solution and sold under the trademark NALCO 11440. Said NALCO 1144® has the following properties:

| | |
|---|---|
| Colloidal Silica as $SiO_2$: | 40%, |
| pH @ 25° C.: | 9.9, |
| Average particle Diameter: | 14 nm, |
| Specific Gravity: | 1.30, |
| Viscosity: | 15 cP, and |
| $Na_2O$ | 0.45%. |

According to another embodiment of the invention, in the method defined hereinabove, the acid may be phosphoric acid, sulfuric acid, citric acid, acetic acid or a mixture of at least two of them. Preferably, the acid may be phosphoric acid.

According to another embodiment of the invention, in the method defined hereinabove, the inorganic wetting agent may be aluminum ammonium sulfate, magnesium sulfate, aluminum sulfate, calcium sulfate or a mixture of at least two of them. Preferably the inorganic wetting agent may be aluminum ammonium sulfate.

According to another embodiment of the invention, in the method defined hereinabove, the acid phosphate adhesive may be calcium phosphate, magnesium phosphate, aluminum phosphate or a mixture of at least two of them. Preferably, the acid phosphate adhesive may be calcium phosphate.

Another embodiment of the invention relates to the method defined hereinabove, wherein the mixture M comprises:
- 30 wt % to 70 wt %, preferably about 55.0 wt. %, of sucrose;
- 70 wt. % to 30 wt. %, preferably about 41.5 wt. %, of water;
- 0 wt. % to 1.8 wt. %, preferably about 1.1 wt. %, of phosphoric acid;
- 0 wt. % to 1.7 wt. %, preferably about 1.0 wt. %, of aluminum ammonium sulfate; and
- 0 wt % to 2.0 wt %, preferably about 1.4 wt. %, of calcium phosphate monobasic.

Another embodiment of the invention relates to the method defined hereinabove, wherein phosphoric acid originates from a mixture of 75 wt % $H_3PO_4$ and 25 wt % water, the amount of water being part of the total amount of water of the composition, the aluminium ammonium sulfate is $AlNH_4(SO_4)_2 \cdot 2H_2O$, and the calcium phosphate monobasic is $Ca(H_2PO_4)_2 \cdot 2H_2O$.

According to another embodiment the invention relates to the method defined hereinabove, wherein said composition comprises from 50 wt. % to 85 wt. % of the product A and from 15 wt. % to 50 wt. % of the product B. Preferably, said composition may comprise about 66 wt % of the product A and about 34 wt % of the product B.

According to another embodiment the invention relates to the method defined hereinabove, wherein the caramelization is carried out by heating the mixture M at a boiling temperature preferably between 100° C. and 105° C., more preferably between 100° C. and 103° C., for a period of time varying from 5 to 10 minutes, preferably about 5 minutes, and then allowing the resulting product A to cool.

According to another embodiment the invention relates to the method defined hereinabove, wherein the at least one inorganic colloidal binding agent is added to the product A by mixing.

Another embodiment of the invention relates to the composition defined hereinabove, wherein the rigidified fabric is made of threads of heat resistant fibers, said heat resistant fibers being glass fibers, silica fibers or a mixture thereof, said threads having a diameter varying from 0.864 mm to 0.533 mm, and the fabric having a meshing varying from 0.94 mm to 0.255 mm, and from 50.9% to 35.9% of openings with respect to the total surface of the fabric.

Another embodiment of the invention relates to the method defined hereinabove, wherein the heat resistant fibers (including heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

As mentioned hereinabove, another embodiment of the invention relates to a method for the preparation of a rigidified fabric made of heat resistant fibers or made of threads of heat resistant fibers, said heat resistant fibers being glass fibers, silica fibers or a mixture thereof, said method comprising the steps of:

a) impregnating a fabric made of heat resistant fibers or made threads of heat resistant fibers, said heat resistant fibers being glass fibers, silica fibers or a mixture thereof, said heat resistant fibers or heat resistant fibers of the threads being free of one or more sizing agents consisting of organic polymers, with a composition as defined hereinabove, to obtain a fabric impregnated with said composition;

b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;

c) optionally forming the thermoplastic fabric obtained from step b) into a desired shape and optionally allowing the fabric so obtained to cool; and d) subjecting the thermoplastic fabric impregnated with the composition, as obtained from step b) or c), to a thermosetting treatment by heating it to a thermosetting temperature to thermoset the thermoplastic composition impregnated in the fabric in order to rigidify the fabric by cross-linking of the heat resistant fibers or the heat resistant fibers of the threads.

According to another embodiment the invention relates to the method defined hereinabove, wherein the thermosetting treatment is carried out between 180° to 450° C. for 6 seconds to 2 minutes, preferably from 6 to 60 seconds.

Another embodiment of the invention relates to the method defined hereinabove for the preparation of a rigidified fabric made of heat resistant fibers or made of threads of heat resistant fibers, said heat resistant fibers being glass fibers, silica fibers or a mixture thereof, wherein the forming of the fabric obtained from step b) into a desired shape is carried out by moulding, optionally with heating and/or pressure. Preferably the heating and/or the pressure are just sufficient to allow an easy forming the desired shape with molds, and more preferably the temperature may vary from 110° C. to 150° C. and the pressure may vary from 1.0 psi to 10 psi.

According to another embodiment the invention, preferably step c) may be carried out either:
- by positioning the thermoplastic fabric obtained from step b), optionally cooled, into a hot mold, and then allowing the shaped fabric so obtained to cool; or
- by positioning the thermoplastic fabric obtained from step b), optionally re-heated to a softened thermoplastic state, into a cold mold.

Preferably, step c) is carried out that the thermoplastic temperature of the composition, that is more preferably from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Another embodiment of the invention relates to the method defined hereinabove, wherein the thermoplastic fabric is made of threads of heat resistant fibers, said heat resistant fibers being glass fibers, silica fibers or a mixture thereof, said threads of heat resistant fibers having a diameter varying from 0.864 mm to 0.533 mm, and the fabric having a meshing varying from 0.94 mm to 0.255 mm, and from 50.9% to 35.9% of openings with respect to the total surface of the fabric.

Another embodiment of the invention relates to the method defined hereinabove for the preparation of a rigidified fabric made of heat resistant fibers or made of threads of heat resistant fibers, wherein the heat resistant fibers (including the heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

According to another embodiment the invention relates to the method defined hereinabove for the preparation of a rigidified fabric of heat resistant fibers or threads of heat resistant fibers, preferably of woven threads of heat resistant fibers, free of one or more sizing agents consisting of organic polymers, wherein said heat resistant fibers are obtained by subjecting to a heat treatment a fabric of heat resistant fibers commonly used in the industry and having its heat resistant fibers or threads of the heat resistant fibers protected with one or more sizing agents consisting of organic polymers (e.g. starches, etc.), said heat resistant fibers being glass fibers, silica fibers or a mixture thereof.

According to another embodiment the invention relates to the method defined hereinabove for the preparation of a rigidified fabric of heat resistant fibers or threads of heat resistant fibers, wherein the heat treatment preferably defines a burnout said organic polymers defining said sizing agents, optionally in the presence of oxygen, more preferably a controlled amount of oxygen. Preferably, the heat treatment may be carried out between 375° C. to 600° C.

As mentioned hereinabove, another embodiment of the invention relates to another method for the preparation of a thermoplastic fabric made of heat resistant fibers or made of threads of heat resistant fibers, said heat resistant fibers being glass fibers, silica fibers or a mixture thereof, said method comprising the steps of:
  a) impregnating a fabric made of heat resistant fibers or made of threads of heat resistant fibers, said heat resistant fibers being glass fibers, silica fibers or a mixture thereof, said heat resistant fibers or heat resistant fibers of the threads being free of one or more sizing agents consisting of organic polymers, with a composition as defined hereinabove, to obtain a fabric impregnated with said composition;
  b)—subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool; and
  c) optionally forming the fabric obtained from step b) into a desired shape to form a shaped fabric, and optionally allowing the shaped fabric to cool;
said fabric obtained from step b) or c) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

Another embodiment of the invention relates to said other method defined hereinabove for the preparation of a rigidified fabric made of heat resistant fibers or made of threads of heat resistant fibers, wherein the forming of the thermoplastic fabric into a desired shape is carried out by moulding, optionally with heating and/or pressure.

According to another embodiment the invention relates to the method defined hereinabove for the preparation of a thermoplastic fabric of heat resistant fibers or threads of heat resistant fibers, wherein preferably step c) may be carried out either:
  by positioning the thermoplastic fabric obtained from step b), optionally cooled, into a hot mold, and then allowing the shaped fabric so obtained to cool; or
  by positioning the thermoplastic fabric obtained from step b), optionally re-heated at a softened thermoplastic state, into a cold mold.

Another embodiment of the invention relates to the composition defined hereinabove, wherein the rigidified fabric is made of threads of heat resistant fibers, said heat resistant fibers being glass fibers, silica fibers or a mixture thereof, said threads having a diameter varying from 0.864 mm to 0.533 mm, and the fabric having a meshing varying from 0.94 mm to 0.255 mm, and from 50.9% to 35.9% of openings with respect to the total surface of the fabric.

Preferably, step c) is carried out that the thermoplastic temperature of the composition, that is more preferably from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Another embodiment of the invention relates to the other method defined hereinabove for the preparation of a rigidified fabric of heat resistant fibers, wherein the heat resistant fibers (including the heat resistant fiber of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

Another embodiment of the invention relates to the method defined hereinabove for the preparation of a rigidified fabric made of heat resistant fibers or made of threads of heat resistant fibers, preferably of woven threads of heat resistant fibers, said heat resistant fibers being glass fibers, silica fibers or a mixture thereof, said heat resistant fibers being free of said one or more sizing agents, said method comprising a step of subjecting to a heating treatment the fabric of heat resistant fibers, preferably of the threads of the heat resistant fibers, provided with a coating of one or more sizing agents selected from the group consisting of organic polymers, to burnout said organic polymers defining said one or more sizing agents, optionally in the presence of oxygen. Preferably, the heat treatment may be carried out between 375° C. to 600° C.

As mentioned hereinabove, another embodiment of the invention relates to a thermoplastic fabric made of heat resistant fibers or made of threads of heat resistant fibers, said heat resistant fibers being glass fibers, silica fibers or a mixture thereof, wherein said thermoplastic fabric is obtained from said method defined hereinabove for the preparation of a rigidified fabric made heat resistant fibers or threads of heat resistant fibers. Preferably, said thermoplastic fabric is made of threads of heat resistant fibers, said threads having a diameter varying from 0.864 mm to 0.533 mm, and the fabric having a meshing varying from 0.94 mm to 0.255 mm, and from 50.9% to 35.9% of openings with respect to the total surface of the fabric.

Another embodiment of the invention relates to a method for preparing a rigidified fabric made of heat resistant fibers or made of threads of heat resistant fibers, said heat resistant fibers being glass fibers, silica fibers or a mixture thereof, said method comprising the step of subjecting the thermoplastic fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

According to another embodiment the invention relates to the method defined hereinabove, wherein the thermosetting treatment is carried out between 180° to 450° C. for 6 seconds to 2 minutes, preferably from 6 to 60 seconds. Preferably, the thermosetting temperature may vary from 300° C. to 450° C., more preferably from 400° C. to 450° C.

Another embodiment of the invention relates to the method defined hereinabove for preparing a rigidified fabric made of heat resistant fibers or made of threads of heat resistant fibers, said heat resistant fibers being glass fibers, silica fibers or a mixture thereof, wherein prior to subjecting the thermoplastic fabric to a thermosetting treatment, said thermosettable fabric is formed into a desired shape and optionally allowed to cool. Preferably, the thermoplastic fabric is previously subjected to a moulding step, optionally with heating and/or pressure, to bring the fabric into a desired shape.

Preferably, the moulding of the thermoplastic fabric is carried out at a temperature from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

As mentioned hereinabove, another embodiment of the invention relates to a rigidified fabric made of heat resistant fibers or threads of heat resistant fibers, said heat resistant fibers being glass fibers, silica fibers or a mixture thereof, wherein said rigidified fabric is obtained from any one of the methods defined hereinabove.

As mentioned hereinabove, another embodiment of the invention relates to a filtration device for the filtering of a liquid metal or an alloy thereof, wherein said filtration device is made of a rigidified fabric as defined herein above and made of heat resistant fibers or made of threads of heat resistant fibers, said heat resistant fibers being glass fibers, silica fibers or a mixture thereof.

Another embodiment of the invention relates to the filtration device defined hereinabove, wherein the liquid metal or alloy thereof is molten aluminum or alloy thereof.

Another embodiment of the invention relates to the filtration device defined hereinabove, wherein the filtering of a liquid metal or an alloy thereof is carried out in a low pressure casting process.

According to another embodiment the invention relates to the filtration device defined hereinabove, wherein said filter is shaped into any usual form for the filtering of a liquid metal or an alloy thereof, especially in a low pressure casting process.

As mentioned hereinabove, according to another embodiment the invention relates to a use of a filter as defined hereinabove, for the filtration of a liquid metal or an alloy thereof.

Another embodiment of the invention relates to a use of the filtration device as defined hereinabove, for the filtration of a liquid metal or an alloy thereof.

Another embodiment of the invention relates to the use defined hereinabove, wherein the molten metal is molten aluminum or an alloy thereof.

Another embodiment of the invention relates to the use defined hereinabove, wherein the filtering of a liquid metal or an alloy thereof is carried out in a low pressure casting process.

As mentioned hereinabove, another embodiment of the invention relates to a first preferred variant of a filtration device for the filtration of a liquid metal or an alloy thereof in a low pressure casting process for the formation a molded article in a low pressure casting installation,
wherein said filtration device is made of at least one ply of a rigidified fabric made of heat resistant fibers or made of threads of heat resistant fibers, as defined hereinabove according to the invention,
wherein said filtration device has a structural shape and orientation and comprises a lower face, an upper face, a peripheral edge, a main portion, and a peripheral portion surrounding the main portion,
wherein the main portion and a part of the peripheral portion are for positioning across an upper opening of a rising tube of the low pressure casting installation,
wherein the main portion is for positioning against a diffuser positioned across a filling inlet of a mold of the low pressure casting installation;
wherein the peripheral portion is shaped to form a convex rim at the upper face and a concave cavity at the lower face, said concave cavity orientation being to be oriented toward the upper opening of the riser tube, and
wherein the peripheral edge is for positioning against a seat portion of the rising tube surrounding the upper opening.

As mentioned hereinabove, another embodiment of the invention relates to a first preferred variant of a filtration device for the filtration of a liquid metal or an alloy thereof in a low pressure casting process for the formation a molded article in a low pressure casting installation,
wherein said filtration device is made of at least one ply of a rigidified fabric made of heat resistant fibers or made of threads of heat resistant fibers, as defined hereinabove according to the invention,
wherein said filtration device has a structural shape and orientation and comprises a lower face, an upper face, a peripheral edge, a main portion, and a peripheral portion surrounding the main portion,
wherein the main portion and a part of the peripheral portion are for positioning across an upper opening of a rising tube of the low pressure casting installation,
wherein the main portion is for positioning against a diffuser positioned across a filling inlet of a mold of the low pressure casting installation;
wherein the main portion is a dome having its summit oriented toward the upper opening of the riser tube, and the upper face of said main portion is contacted by the diffuser;
wherein the peripheral portion is shaped to form a convex rim at the upper face and a concave cavity at the lower face, said concave cavity orientation being to be oriented toward the upper opening of the riser tube, and wherein the peripheral edge is for positioning against a seat portion of the rising tube surrounding the upper opening.

As mentioned hereinabove, another embodiment of the invention relates to the second preferred variant of a filtration device for the filtration of a liquid metal or an alloy thereof in a low pressure casting process for the formation a molded article in a low pressure casting installation, wherein said low pressure casting installation comprises:
  a reservoir containing the liquid metal or the alloy thereof;
  a mold provided with a cavity, a filing inlet and a diffuser mounted across the filling inlet;
  the filtration device;
  a rising tube having
    a lower end provided with a lower opening immerged into the liquid metal or the alloy thereof contained in the reservoir,
    an upper end provided with an upper opening connectable with the filing inlet of the mold and provided with a seat portion surrounding the upper opening, and
    a rising channel connecting the lower opening and the upper opening, in order to place the reservoir and the inlet of the mold in fluid communication when the upper opening is connected with the filing inlet, and the filtration device contacted by the diffuser; and
  means for the displacement of an amount of the liquid metal or the alloy thereof contained in the reservoir, through the rising channel of the rising tube, the filtration device, and the filling inlet to fill the cavity;
wherein said filtration device is made of at least one ply of a rigidified fabric made of heat resistant fibers or threads of heat resistant fibers, as defined hereinabove according to the invention, and has a structural shape and orientation,
wherein said filtration device comprises:
  a lower face, an upper face, a peripheral edge, a main portion, and a peripheral portion surrounding the main portion,
wherein the main portion and a part of the peripheral portion are for positioning across the upper opening of the riser tube,
wherein the main portion is for positioning against the diffuser, the peripheral portion being shaped to form a convex rim at the upper face and a concave cavity at the lower face,
wherein the main portion is a dome having its summit oriented toward the upper opening, and the upper face of said main portion is contacted by the diffuser;
wherein said concave cavity is to be oriented toward the upper opening, and
wherein the peripheral edge is for positioning against the seat portion of the rising tube.

Preferably, the diffuser applies a pressure against the main portion of the filtration device so as to slightly push it toward the riser tube. Such a pressure applied by the diffuser allows to keep the filtration device in place during the priming of the filtration device (i.e. when the liquid starts to pass through the filter).

Another embodiment of the invention relates to the first and second variants of filtrations devices defined hereinabove, wherein the convex rim has an arc-shaped cross-section.

Another embodiment of the invention relates to the first and the second variant of a filtration device as defined herein above, wherein the fabric is made of woven thread of heat resistant fibers, said heat resistant fibers being glass fibers, silica fibers or a mixture thereof, said threads having a diameter varying from 0.864 mm to 0.533 mm, and the fabric having a meshing varying from 0.94 mm to 0.255 mm, and from 50.9% to 35.9% of openings with respect to the total surface of the fabric.

Another embodiment of the invention relates to the first and second variants of filtrations devices defined hereinabove, wherein the main portion is further provided with an insert made of a magnetisable material, for handling of the filtration device with a tool provided with a magnet. Preferably, the tool may be operated by a robotized arm.

Another embodiment of the invention relates to the first and second variants of filtrations devices defined hereinabove, wherein the insert is a stainless steel staple. Preferably, the stainless steel staple may be of any type currently available on the market, and more preferably stainless steel staples which can be applied with ordinary industrial staplers. This kind of staples and staplers being well known to skilled persons, there is no needs to define them in details. Also, tools provided with a magnet are well known to skilled workmen, and do not need to be further defined.

Another embodiment of the invention relates to a first preferred method for the preparation of the first or second variant of the filtration device defined hereinabove, said filtration device being made of a rigidified fabric made of heat resistant fibers or made of threads of heat resistant fibers, said method comprising the steps of:
a) impregnating a fabric made of heat resistant fibers or made threads of heat resistant fibers, said heat resistant fibers being glass fibers, silica fibers or a mixture thereof, said heat resistant fibers or heat resistant fibers of the threads being free of one or more sizing agents consisting of organic polymers, with the composition as defined hereinabove, to obtain a fabric impregnated with said composition;
b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;
c) forming the fabric obtained from step b) into the shape of the aforesaid first or second variant of the filtration device, and optionally allowing the fabric so obtained to cool, said forming of the fabric obtained from step b) into a desired shape is carried out by moulding, optionally with heating and/or pressure; and
d) subjecting the fabric impregnated with the composition, as obtained from step b) or c), to a thermosetting treatment by heating it to a thermosetting temperature to thermoset the thermoplastic composition impregnated in the fabric in order to rigidify the fabric by cross-linking of the heat resistant fibers or the heat resistant fibers of the threads.

Preferably, step c) is carried out that the thermoplastic temperature of the composition, that is more preferably from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Preferably, the thermosetting treatment is carried out between 180° to 450° C. for 6 seconds to 2 minutes, preferably from 6 to 60 seconds. More preferably, the thermosetting temperature may vary from 300° C. to 450° C., more preferably from 400° C. to 450° C.

Another embodiment of the invention relates to the first preferred method defined hereinabove for the preparation of a rigidified fabric made of heat resistant fibers or made of threads of heat resistant fibers, wherein the heat resistant fibers (including heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

Another embodiment of the invention relates to the first preferred method defined hereinabove for the preparation of a rigidified fabric made of heat resistant fibers or threads of heat resistant fibers, preferably of woven threads of heat resistant fibers, said heat resistant fibers being glass fibers, silica fibers or a mixture thereof, said heat resistant fibers being free of said one or more sizing agents, said method comprising a step of subjecting to a heating treatment a fabric of heat resistant fibers, preferably of threads of heat resistant fibers, provided with a coating of one or more sizing agents selected from the group consisting of organic polymers, to burnout said organic polymers defining said one or more sizing agents, optionally in the presence of oxygen. Preferably, the heat treatment may be carried out between 375° C. to 600° C.

As mentioned hereinabove, another embodiment of the invention relates to a second preferred method for the preparation of a thermoplastic, rigidified fabric made of heat resistant fibers or made of threads of heat resistant fibers, said method comprising the steps of:
  a) impregnating a fabric made of heat resistant fibers or made of threads of heat resistant fibers, said heat resistant fibers being glass fibers, silica fibers or a mixture thereof, said heat resistant fibers or heat resistant fibers of the threads being free of one or more sizing agents consisting of organic polymers, with the composition as defined hereinabove, to obtain a fabric impregnated with said composition;
  b)—subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool; and
  c) forming the fabric obtained from step b) into a shape of the aforesaid first or second variant of the filtration device, said forming of the thermoplastic fabric into a desired shape is carried out by moulding, optionally with heating and/or pressure, and optionally allowing the shaped fabric to cool;
said fabric obtained from step b) or c) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

Another embodiment of the invention relates to the thermoplastic, rigidified fabric defined hereinabove, wherein said fabric is made of threads of heat resistant fibers, said heat resistant fibers being glass fibers, silica fibers or a mixture thereof, said threads having a diameter varying from 0.864 mm to 0.533 mm, and the fabric having a meshing varying from 0.94 mm to 0.255 mm, and from 50.9% to 35.9% of openings with respect to the total surface of the fabric.

Preferably, step c) is carried out that the thermoplastic temperature of the composition, that is more preferably from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Another embodiment of the invention relates to the second preferred method defined hereinabove for the preparation of a rigidified fabric of heat resistant fibers, wherein the heat resistant fibers (including the heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

Another embodiment of the invention relates to the second preferred method defined hereinabove for the preparation of a thermoplastic, rigidified fabric made of heat resistant fibers or made of threads of heat resistant fibers, preferably of woven threads of heat resistant fibers, said heat resistant fibers being glass fibers, silica fibers or a mixture thereof, said heat resistant fibers being free of said one or more sizing agents, said method comprising a step of subjecting to a heating treatment a fabric of heat resistant fibers, preferably of threads of heat resistant fibers, provided with a coating of one or more sizing agents selected from the group consisting of organic polymers, to burnout said organic polymers defining said one or more sizing agents, optionally in the presence of oxygen. Preferably, the heat treatment may be carried out between 375° C. to 600° C.

As mentioned hereinabove, another embodiment of the invention relates to a thermoplastic fabric made of heat resistant fibers or made of threads of heat resistant fibers, wherein said thermoplastic fabric is obtained from said second preferred method defined hereinabove for the preparation of a rigidified fabric made heat resistant fibers or threads of heat resistant fibers, said heat resistant fibers being glass fibers, silica fibers or a mixture thereof.

As mentioned hereinabove, another embodiment of the invention relates to a third preferred method for preparing a rigidified fabric made of heat resistant fibers or made of threads of heat resistant fibers, said heat resistant fibers being glass fibers, silica fibers or a mixture thereof said method comprising the step of subjecting the thermoplastic fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

According to another embodiment the invention relates to any one of the first to third methods defined hereinabove, wherein the thermosetting treatment is carried out between 180° to 450° C. for 6 seconds to 2 minutes, preferably from 6 to 60 seconds. More preferably, the thermosetting temperature may vary from 300° C. to 450° C., more preferably from 400° C. to 450° C.

Another embodiment of the invention relates to any one of the first to third methods defined hereinabove for the manufacture of the filtration device, wherein the forming of the thermoplastic fabric into said structural shape is carried out by molding, optionally with heating and/or pressure.

According to another embodiment the invention, preferably said step c) can be carried out either:

by positioning the thermoplastic fabric obtained from step b), optionally cooled, into a hot mold, and then allowing the shaped fabric so obtained to cool; or by positioning the thermoplastic fabric obtained from step b), optionally re-heated to a softened thermoplastic state, into a cold mold.

Preferably, the forming of the thermoplastic fabric is carried out that the thermoplastic temperature of the composition, that is more preferably from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Another embodiment of the invention relates to any one of the first to third preferred methods defined hereinabove, wherein said any one of said method further comprises a step of fastening an insert made of a magnetisable material to the filtration device, said insert being susceptible to be magnetized for handling of the filtration device with a tool provided with a magnet.

Another embodiment of the invention relates to any one of the first to third method defined hereinabove, wherein the insert is a stainless steel staple. Preferably, the stainless steel staple may be of any type currently available on the market, and more preferably stainless steel staples which can be applied with ordinary industrial staplers. This kind of staples and staplers being well known to skilled persons, there is no needs to define them in details. Also, tools provided with a magnet are well known to skilled workmen, and do not need to be further defined.

As mentioned hereinabove, another embodiment of the invention relates to a third variant of a filtration device for the filtration of a liquid metal or an alloy thereof in a low pressure casting process for the formation a molded article in a low pressure casting installation, wherein said filtration device is made of a first basket and a second basket, each of said baskets being made of at least one ply of a rigidified fabric made of heat resistant fibers or made of threads of heat resistant fibers, as defined hereinabove according to the invention, wherein the first basket has an outer wall and a cavity defined by an inner wall, an end wall and an opening opposite to the end wall, wherein the second basket has an outer wall and a cavity defined by an inner wall, an end wall and an opening opposite to the end wall, wherein the opened end of the first basket is housed within the cavity of the second basket to define a filtration body having a structural shape and orientation and being provided with a cavity, an upper face, a lower face, and a side face, said filtration body being optionally further provided with a filtration pad within said cavity;

wherein the end wall of the first basket corresponds to the upper face of the filtration body, and the end wall of the second basket corresponds to the lower face of the filtration body, wherein when the outer wall of the first basket is sized to be friction fit against the inner wall of the second basket, the outer wall of the second basket corresponds at least in part to the side face of the filtration body, or when the outer wall of the second basket is sized to be friction fit against the inner wall of the first basket, the outer wall of the first basket corresponds at least in part to the side face of the filtration body, wherein a main portion and a peripheral portion of the filtration body are for positioning across an upper opening of a rising tube of the low pressure casting installation, upper face of the filtration body has a main portion and the lower face of the filtration body has a peripheral portion, wherein the main portion of the filtration body is for positioning against a diffuser positioned across a filling inlet of a mold of the low pressure casting installation;

wherein said peripheral portion is to be oriented toward the upper opening of the riser tube and for positioning against a seat portion of the rising tube surrounding the upper opening.

As mentioned hereinabove, another embodiment of the invention relates to the third variant of a filtration device for the filtration of a liquid metal or an alloy thereof in a low pressure casting process for the formation a molded article in a low pressure casting installation, wherein said filtration device is made of a first basket and a second basket, each of said baskets being made of at least one ply of a rigidified fabric made of heat resistant fibers or made of threads of heat resistant fibers, as defined hereinabove according to the invention, wherein the first basket has an outer wall and a cavity defined by an inner wall, an end wall and an opening opposite to the end wall, wherein the second basket has an outer wall and a cavity defined by an inner wall, an end wall and an opening opposite to the end wall, wherein the opened end of the first basket is housed within the cavity of the second basket to define a filtration body having a structural shape and orientation and being provided with a cavity, an upper face, a lower face, and a side face, said filtration body being further provided with a filtration pad within said cavity;

wherein the end wall of the first basket corresponds to the upper face of the filtration body, and the end wall of the second basket corresponds to the lower face of the filtration body, wherein when the outer wall of the first basket is sized to be friction fit against the inner wall of the second basket, the outer wall of the second basket corresponds at least in part to the side face of the filtration body, or when the outer wall of the second basket is sized to be friction fit against the inner wall of the first basket, the outer wall of the first basket corresponds at least in part to the side face of the filtration body, wherein a main portion and a peripheral portion of the filtration body are for positioning across an upper opening of a rising tube of the low pressure casting installation, wherein the main portion of the filtration body is for positioning against a diffuser positioned across a filling inlet of a mold of the low pressure casting installation;

wherein said peripheral portion is to be oriented toward the upper opening of the riser tube and for positioning against a seat portion of the rising tube surrounding the upper opening.

As mentioned hereinabove, another embodiment of the invention relates to the fourth variant of a filtration device for the filtration of a liquid metal or an alloy thereof in a low pressure casting process for the formation a molded article in a low pressure casting installation, wherein said low pressure casting installation comprises:
a reservoir containing the liquid metal or the alloy thereof;
a mold provided with a cavity, a filing inlet and a diffuser mounted across the filling inlet;
the filtration device;
a rising tube having
a lower end provided with a lower opening immerged into the liquid metal or the alloy thereof contained in the reservoir, an upper end provided with an upper opening connectable with the filing inlet of the mold and provided with a seat portion surrounding the upper opening, and a rising channel connecting the lower opening and the upper opening, in order to place the reservoir and the inlet of the mold in fluid communication when the upper opening is connected with the filing inlet, and the filtration device contacted by the diffuser; and means for the displacement of an amount of the liquid metal or the alloy thereof contained in the reservoir, through the rising channel of the rising tube, the filtration device, and the filling inlet to fill the cavity;

wherein said filtration device is made of a first basket and a second basket, each of said baskets being made of at least one ply of a rigidified fabric made of heat resistant fibers or made of threads of heat resistant fibers, as defined hereinabove according to the invention, wherein the first basket has an outer wall and a cavity defined by an inner wall, an end wall and an opening opposite to the end wall, wherein the second basket has an outer wall and a cavity defined by an inner wall, an end wall and an opening opposite to the end wall, wherein the opened end of the first basket is housed within the cavity of the second basket to define a filtration body having a structural shape and orientation and being provided with a cavity, optionally provided with a filtration pad within the cavity, an upper face, a lower face, and a side face, said filtration body being further provided with a filtration pad within said cavity;

wherein the end wall of the first basket corresponds to the upper face of the filtration body, and the end wall of the second basket corresponds to the lower face of the filtration body, wherein when the outer wall of the first basket is sized to be friction fit against the inner wall of the second basket, the outer wall of the second basket corresponds at least in part to the side face of the filtration body, or when the outer wall of the second basket is sized to be friction fit against the inner wall of the first basket, the outer wall of the first basket corresponds at least in part to the side face of the filtration body, wherein upper face of the filtration body has a main portion and the lower face of the filtration body has a peripheral portion, wherein the main portion of the filtration body is for positioning against a diffuser positioned across a filling inlet of a mold of the low pressure casting installation;

wherein said peripheral portion is for positioning across an upper opening of a rising tube of the low pressure casting installation, said peripheral portion being to be oriented toward the upper opening of the riser tube and for positioning against a seat portion of the rising tube surrounding the upper opening.

Preferably, in the third and fourth variants of the filtration devices defined hereinabove, the diffuser applies a pressure against the main portion of the filtration device so as to slightly push it toward the riser tube. Such a pressure applied by the diffuser allows to keep the filtration device in place during the priming of the filtration device (i.e. when the liquid starts to pass through the filter).

Preferably, in the third and fourth variants of the filtration devices defined hereinabove, the outer wall of the first basket and the inner wall of the second basket may be mechanically locked together. More preferably, to do so, any appropriate means can be used, and much more particularly according to a particularly preferred embodiment of the invention, the outer wall of the second basket is further provided with a portion that is outwardly projecting and sized to match with a corresponding recess provided in the inner wall of the first basket, or vice-versa.

Another embodiment of the invention relates to the third and the fourth variant of a filtration device as defined hereinabove, wherein the fabric is made of woven thread of heat resistant fibers, said heat resistant fibers being glass fibers, silica fibers or a mixture thereof, said threads having a diameter varying from 0.864 mm to 0.533 mm, and the fabric having a meshing varying from 0.94 mm to 0.255 mm, and from 50.9% to 35.9% of openings with respect to the total surface of the fabric.

Another embodiment of the invention relates to any one of the third and fourth variants of the filtration devices defined hereinabove, wherein the outer wall of the second basket is sized to be friction fit against the inner wall of the first basket, and wherein the outer wall of the first basket corresponds at least in part to the side face of the filtration body.

Another embodiment of the invention relates any one of the third and fourth variants of the filtration devices defined hereinabove, wherein the cavity of the filtration body is filled with a filtration pad or member. Preferably, said filtration pad or member can be of any kind currently used of the filtration of liquid metal or alloys (e.g. aluminum). According to a particularly preferred embodiment of the invention, the pad or member made of heat resistant fibers, said heat resistant fibers being glass fibers, silica fibers or a mixture thereof, such as a pad made of a felt of heat resistant fibers, can be used.

Another embodiment of the invention relates to any one of the third and fourth variants of the filtration devices defined hereinabove, wherein the first basket and the second basket are manufactured according to a method as defined hereinabove, and wherein said first and second basket are friction fit one into the other, optionally after having placed a filtration pad of felted heat resistant fibers in the cavity, while said baskets are still into a thermoplastic stage. Then, the resulting body is placed into a mold and heated to a thermosetting temperature to give the resulting filtration device.

Preferably, in the third and fourth variants of the filtration devices defined hereinabove, the heat resistant fibers or the heat resistant fibers of the threads of heat resistant fibers, of the first basket and of the second basket, and optionally the heat resistant fibers of the filtration pad, are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

Another embodiment of the invention relates to any one of the third and fourth variants of the filtration devices defined hereinabove, wherein the main portion is further provided with an insert made of a magnetisable material, for handling of the filtration device with a tool provided with a magnet.

Another embodiment of the invention relates to any one of the third and fourth variants of the filtration devices defined hereinabove, wherein the insert is a stainless steel staple. Preferably, the stainless steel staple may be of any type currently available on the market, and more preferably stainless steel staples which can be applied with ordinary industrial staplers. This kind of staples and staplers being well known to skilled persons, there is no needs to define them in details. Also, tools provided with a magnet are well known to skilled workmen, and do not need to be further defined.

As mentioned hereinabove, another embodiment of the invention relates to a fourth preferred method for the preparation of the third or second variant of the filtration device defined hereinabove, said filtration device being made of a rigidified fabric made of heat resistant fibers or made of threads of heat resistant fibers, said heat resistant fibers being glass fibers, silica fibers or a mixture thereof, said method comprising the steps of:
 a) impregnating a fabric made of heat resistant fibers or made threads of heat resistant fibers, said heat resistant fibers being glass fibers, silica fibers or a mixture thereof, said heat resistant fibers or heat resistant fibers of the threads being free of one or more sizing agents consisting of organic polymers, with the composition as defined hereinabove according to the invention, to obtain a fabric impregnated with said composition;
 b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;
 c) forming the fabric obtained from step b) into the shape of the first basket or the second basket of the aforesaid third or fourth variant of the filtration device, and optionally allowing the fabric so obtained to cool, said forming being carried out by moulding, optionally with heating and/or pressure;
 d) assembling the first basket and the second basket to form a filtration body, optionally with a pad of a felt of heat resistant fiber within the filtration body, and
 e) subjecting the filtration body as obtained from step d) to a thermosetting treatment, optionally in a mold, by heating it to a thermosetting temperature to thermoset the thermoplastic composition impregnated in the fabric in order to rigidify the fabric by cross-linking of the heat resistant fibers or the heat resistant fibers of the threads.

Preferably, the forming of the thermoplastic fabric is carried out that the thermoplastic temperature of the composition, that is more preferably from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Preferably, the thermosetting treatment is carried out between 180° to 450° C. for 6 seconds to 2 minutes, preferably from 6 to 60 seconds. More preferably, the thermosetting temperature may vary from 300° C. to 450° C., and much more preferably from 400° C. to 450° C.

Another embodiment of the invention relates to the fourth preferred method defined hereinabove for the preparation of a rigidified fabric made of heat resistant fibers or made of threads of heat resistant fibers, wherein the heat resistant fibers (including heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

Another embodiment of the invention relates to the fourth preferred method defined hereinabove for the preparation of a rigidified fabric made of heat resistant fibers or threads of heat resistant fibers, preferably of woven threads of heat resistant fibers, said heat resistant fibers being glass fibers, silica fibers or a mixture thereof, said heat resistant fibers being free of said one or more sizing agents, said method comprising a step of subjecting to a heating treatment a fabric of heat resistant fibers, preferably of threads of heat resistant fibers, provided with a coating of one or more sizing agents selected from the group consisting of organic polymers, to burnout said organic polymers defining said one or more sizing agents, optionally in the presence of oxygen. Preferably, the heat treatment may be carried out between 375° C. to 600° C.

As mentioned hereinabove, another embodiment of the invention relates to a fifth preferred method for the preparation of a rigidified fabric made of heat resistant fibers or made of threads of heat resistant fibers, said heat resistant fibers being glass fibers, silica fibers or a mixture thereof, said method comprising the steps of:
 a) impregnating a fabric made of heat resistant fibers or made of threads of heat resistant fibers, said heat resistant fibers being glass fibers, silica fibers or a mixture thereof, said heat resistant fibers or heat resistant fibers of the threads being free of one or more sizing agents consisting of organic polymers, with the composition as defined hereinabove according to the invention, to obtain a fabric impregnated with said composition;
 b)—subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool;
 c) forming the fabric obtained from step b) into a shape of the aforesaid first basket and the second basket of the third variant of the filtration device, said forming of the thermoplastic fabric into a desired shape is carried out by moulding, optionally with heating and/or pressure, and optionally allowing the shaped fabric to cool;
 d) assembling the first basket and the second basket to form a filtration body, optionally with a pad of heat resistant fiber within the filtration body;
said fabric obtained from step d) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

Preferably, step c) is carried out that the thermoplastic temperature of the composition, that is more preferably from 101 to 160° C. More preferably the heating and/or the pressure are just sufficient to allow an easy forming the desired shape with molds, and much more preferably the temperature may vary from 110° C. to 150° C. and the pressure may vary from 1.0 psi to 10 psi.

Another embodiment of the invention relates to the fifth preferred method defined hereinabove for the preparation of a rigidified fabric of heat resistant fibers,
 wherein the heat resistant fibers are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

Another embodiment of the invention relates to the fifth preferred method defined hereinabove for the preparation of a rigidified fabric made of heat resistant fibers or made of threads of heat resistant fibers, preferably of woven threads of heat resistant fibers, said heat resistant fibers being glass fibers, silica fibers or a mixture thereof, said heat resistant fibers being free of said one or more sizing agents, said method comprising a step of subjecting to a heating treatment a fabric of heat resistant fibers, preferably of threads of heat resistant fibers, provided with a coating of one or more sizing agents selected from the group consisting of organic polymers, to burnout said organic polymers defining said one or more sizing agents, optionally in the presence of oxygen. Preferably, the heat treatment may be carried out between 375° C. to 600° C.

Another embodiment of the invention relates to a thermoplastic fabric made of heat resistant fibers or made of threads of heat resistant fibers, wherein said thermoplastic fabric is obtained from said fifth preferred method defined hereinabove for the preparation of a rigidified fabric made heat resistant fibers or threads of heat resistant fibers.

As mentioned hereinabove, another embodiment of the invention relates to a sixth preferred method for preparing a rigidified fabric made of heat resistant fibers or made of threads of heat resistant fibers, said heat resistant fibers being glass fibers, silica fibers or a mixture thereof, said method comprising the step of subjecting the thermoplastic fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

Preferably, thermosetting treatment is carried out between 180° to 450° C. for 6 seconds to 2 minutes, preferably from 6 to 60 seconds. More preferably, the thermosetting temperature may vary from 300° C. to 450° C., more preferably from 400° C. to 450° C.

Another embodiment of the invention relates to any one of the fourth to sixth methods defined hereinabove for the manufacture of the filtration device, wherein the forming of the thermoplastic fabric into said structural shape is carried out by molding, optionally with heating and/or pressure.

According to another embodiment the invention relates to any one of the fourth to sixth methods defined hereinabove, wherein preferably said step c) can be carried out either:
by positioning the thermoplastic fabric obtained from step b), optionally cooled, into a hot mold, and then allowing the shaped fabric so obtained to cool; or
by positioning the thermoplastic fabric obtained from step b), optionally re-heated to a softened thermoplastic state, into a cold mold.

Preferably, the moulding of the thermoplastic fabric is carried out at a temperature of from 101 to 160° C. More preferably the heating and/or the pressure are just sufficient to allow an easy forming the desired shape with molds, and more preferably the temperature may vary from 110° C. to 150° C. and the pressure may vary from 1.0 psi to 10 psi.

Another embodiment of the invention relates to a process for filtering a liquid metal or an alloy thereof in a low pressure casting process for the formation a molded article in a low pressure casting installation, said process comprising a step of filtering said liquid metal or an alloy thereof with any one of the filter or filtering devices defined hereinabove according to the invention.

Another embodiment of the invention relates to the process as defined hereinabove for filtering a liquid metal or an alloy thereof in a low pressure casting process for the formation a molded article in a low pressure casting installation, said low pressure casting installation comprising:
a reservoir containing the liquid metal or the alloy thereof;
a mold provided with a cavity, a filing inlet and a diffuser mounted across the filling inlet;
a filtration device;
a rising tube having a lower end provided with a lower opening, and an upper end provided with an upper opening, both opening being connected to a rising channel, the lower opening being immerged into the liquid metal or the alloy thereof contained in the reservoir, and the upper end being connectable with the filing inlet of the mold, in order to place the reservoir and the inlet of the mold in fluid communication, said rising tube being further provided with a seat portion on which the filtration device is positioned, said seat portion surrounding the upper opening, so as when the upper end connects with the filing inlet, the filtration device is positioned across the upper opening and contacted by the diffuser; and
means for the displacement of an amount of the liquid metal or the alloy thereof contained in the reservoir, through the rising tube, the filter and the filter inlet to fill the cavity;
and said process comprising the displacement of the liquid metal or the alloy thereof from the reservoir, through the rising channel of the rising tube, the filtration device and the filling inlet, to fill the cavity of the mold, and cooling of the liquid metal or the alloy thereof contained in the cavity of the mold to form the molded article with the filtration device trapped into a protrusion of the article.

Another embodiment of the invention relates to the process as defined hereinabove for filtering a liquid metal or an alloy thereof in a low pressure casting process for the formation a molded article in a low pressure casting installation, wherein the filter or filtration device according to the invention is further provided with an insert made of a magnetisable material, said method further comprising a step of handling and positioning the filter or the filtration device in position with a tool provided with a magnet, preferably a tool is operated by a robotized arm.

Another embodiment of the invention relates to the process as defined hereinabove for filtering a liquid metal or an alloy thereof in a low pressure casting process for the formation a molded article in a low pressure casting installation, wherein said means for the displacement of an amount of the liquid metal or the alloy thereof contained in the reservoir, through the rising tube, the filtration device and the filling inlet to fill the cavity of the mold, is a pressurized gas introduced in the reservoir.

Another embodiment of the invention relates to the process as defined hereinabove for filtering a liquid metal or an alloy thereof in a low pressure casting process for the formation a molded article in a low pressure casting installation, wherein the pressurized gas is nitrogen.

Another embodiment of the invention relates to the process as defined hereinabove for filtering a liquid metal or an alloy thereof in a low pressure casting process for the formation a molded article in a low pressure casting installation, wherein the protrusion of the molded article is removed and re-melted for recycling purpose of the metal or alloy thereof.

Another embodiment of the invention relates to the process as defined hereinabove for filtering a liquid metal or an alloy thereof in a low pressure casting process for the formation a molded article in a low pressure casting installation, wherein said method further comprises a step of re-melting the protrusion of the molded article comprising the filter of the filtration device, and a step of recovering said filter or filtration device that floats on top of re-melted metal or the alloy thereof.

Another embodiment of the invention relates to the use of any one of the filtration devices defined hereinabove according to the invention, for the filtration of a liquid metal or an alloy thereof in a low pressure casting process for the formation a molded article in a low pressure casting installation.

Another embodiment of the invention relates to the use of any one of the filtration devices as defined hereinabove according to the invention, for the filtration of a liquid metal or an alloy thereof in a low pressure casting process for the formation a molded article in a low pressure casting installation, said low pressure casting installation comprising:
  a reservoir containing the liquid metal or the alloy thereof;
  a mold provided with a cavity, a filing inlet and a diffuser mounted across the filling inlet;
  the filtration device;
  a rising tube having a lower end provided with a lower opening, and an upper end provided with an upper opening, both opening being connected to a rising channel, the lower opening being immerged into the liquid metal or the alloy thereof contained in the reservoir, and the upper end being connectable with the filing inlet of the mold, in order to place the reservoir and the inlet of the mold in fluid communication, said rising tube being further provided with a seat portion on which the filtration device is positioned, said seat portion surrounding the upper opening, so as when the upper end connects with the filing inlet, the filtration device is positioned across the upper opening and contacted by the diffuser; and
  means for the displacement of an amount of the liquid metal or the alloy thereof contained in the reservoir, through the rising tube, the filter and the filter inlet to fill the cavity;
and said process comprising the displacement of the liquid metal or the alloy thereof from the reservoir, through the rising channel of the rising tube, the filtration device and the filling inlet, to fill the cavity of the mold, and cooling of the liquid metal or the alloy thereof contained in the cavity of the mold to form the molded article with the filtration device trapped into a protrusion of the article.

Another embodiment of the invention relates to the use of any one of the filtration devices as defined hereinabove according to the invention, wherein when the main portion of the filtration device is provided with an insert that can be magnetized, and wherein said filtration device is positioned by a tool provided with a magnet and operated by a robotized arm.

Another embodiment of the invention relates to the use of any one of the filtration devices as defined hereinabove according to the invention, wherein said means for the displacement of an amount of the liquid metal or the alloy thereof contained in the reservoir, through the rising tube, the filtration device and the filling inlet to fill the cavity of the mold, is a pressurized gas introduced in the reservoir.

Another embodiment of the invention relates to the use of any one of the filtration device as defined hereinabove, wherein the pressurized gas is nitrogen.

Another embodiment of the invention relates to the use of any one of the filtration device as defined hereinabove, wherein the protrusion of the molded article is removed and re-melted for recycling purpose of the metal or alloy thereof.

Another embodiment of the invention relates to the use of a filtration device as defined hereinabove, wherein the filtration device floats on top of re-melted metal or the alloy thereof, to allow the removal of the filtration device by flotation.

A low pressure casting pressure casting installation, said low pressure casting installation comprising:
  a reservoir containing the liquid metal or the alloy thereof;
  a mold provided with a cavity, a filing inlet and a diffuser mounted across the filling inlet;
  a filtration device as defined hereinabove according to the invention;
  a rising tube having
    a lower end provided with a lower opening immerged into the liquid metal or the alloy thereof contained in the reservoir,
    an upper end provided with an upper opening connectable with the filing inlet of the mold and provided with a seat portion surrounding the upper opening, and
    a rising channel connecting the lower opening and the upper opening, in order to place the reservoir and the inlet of the mold in fluid communication when the upper opening is connected with the filing inlet, and the filtration device contacted by the diffuser; and
  means for the displacement of an amount of the liquid metal or the alloy thereof contained in the reservoir, through the rising channel of the rising tube, the filtration device, and the filling inlet to fill the cavity;

Another embodiment of the invention relates to the low pressure casting pressure casting installation defined hereinabove, wherein when the filtration device has a main portion that is provided with an insert made of magnetisable material, said installation being provided with means comprising a tool provided with a magnet to handle and position the filtration device in place, said tool being operated by a robotized arm.

Another embodiment of the invention relates to the low pressure casting pressure casting installation defined hereinabove, wherein said means for the displacement of an amount of the liquid metal or the alloy thereof contained in the reservoir, through the rising tube, the filtration device and the filling inlet, to fill the cavity of the mold, is a pressurized gas introduced in the reservoir.

Another embodiment of the invention relates to the low pressure casting pressure casting installation defined hereinabove, wherein the pressurized gas is nitrogen.

Another embodiment of the invention relates to the low pressure casting pressure casting installation defined hereinabove, wherein means are provided to remove the protrusion of the molded article, and then re-melted it for recycling of the metal or metal alloy.

Another embodiment of the invention relates to the low pressure casting installation defined hereinabove, wherein means are provided for recovering the filtration devices floating on top of re-melted liquid metal or alloy thereof.

A low pressure casting process for the formation a molded article in a low pressure casting installation, said low pressure casting installation comprising:
  a reservoir containing the liquid metal or the alloy thereof;
  a mold provided with a cavity, a filing inlet and a diffuser mounted across the filling inlet;
  a filtration device;
  a rising tube having a lower end provided with a lower opening immerged into the liquid metal or the alloy thereof contained in the reservoir, an upper end provided with an upper opening connectable with the filing inlet of the mold and provided with a seat portion surrounding the upper opening, and a rising channel connecting the lower opening and the upper opening, in order to place the reservoir and the inlet of the mold in fluid communication when the upper opening is connected with the filing inlet, and the filtration device contacted by the diffuser; and means for the displacement of an amount of the liquid metal or the alloy thereof contained in the reservoir, through the rising channel of the rising tube, the filtration device, and the filling inlet to fill the cavity;

wherein said process comprises the steps of:

a) positioning any one of the filtration device as defined hereinabove according to the invention, on the seat portion of the rising tube, with the main portion and a part of the peripheral portion positioned across the upper opening, the concave cavity being oriented toward the upper opening, and the peripheral edge resting against the seat portion;

b) connecting the upper opening of the rising tube with the filing inlet of the mold with the filtration device contacted by the diffuser;

c) displacing the liquid metal or the alloy thereof from the reservoir, through the rising channel of the rising tube, the filtration device and the filling inlet, to fill the cavity, optionally returning the excess of the displaced liquid metal or the alloy thereof to the reservoir;

d) cooling of the liquid metal or the alloy thereof contained in the cavity to form the molded article with the filtration device trapped in a protrusion of the article;

e) removing the molded article from the mold with the filtration device trapped in the protrusion of the article; and f) optionally repeating steps a) to e) to mold another article.

Another embodiment of the invention relates to the process defined hereinabove, wherein when the main portion of the filtration device is provided with an insert that can be magnetized, and wherein said filtration device is positioned by a tool provided with a magnet and operated by a robotized arm.

Another embodiment of the invention relates to the process defined hereinabove, wherein said means for the displacement of an amount of the liquid metal or the alloy thereof contained in the reservoir, through the rising tube, the filtration device and the filling inlet, to fill the cavity of the mold, is a pressurized gas introduced in the reservoir.

Another embodiment of the invention relates to the process defined hereinabove, wherein the pressurized gas is nitrogen.

Another embodiment of the invention relates to the process defined hereinabove, wherein the protrusion of the molded article is removed from the molded article, and then re-melted for recycling of the metal or metal alloy.

Another embodiment of the invention relates to the process defined hereinabove, wherein the filtration device floats on top of re-melted liquid metal or alloy thereof, to allow the removal of the filtration device by flotation.

The invention and its advantages will be better understood upon reading the following non-restrictive detailed description thereof.

BRIEF DESCRIPTION OF THE DRAWINGS

The present invention will be better understood with reference to the following drawings.

EXAMPLES

Example 1

A composition according to the invention was prepared as follows:

In a first step, a mixture M was prepared by admixing the following ingredients together in a stainless steel container. More particularly, the ingredients of the mixture consist of:

Food graded table sucrose (i.e. table sugar) sold by Lantic Inc. under the trade name Lantic (hereinafter called sucrose in the present example).

Tap water as available from the Applicant's laboratory facilities located in the city of Sherbrooke, Quebec, Canada.

Laboratory grade phosphoric acid 75% wt. (i.e. a mixture of 75 wt % $H_3PO_4$ and 25 wt % water).

Calcium phosphate monobasic sold by Spectrum Chemical Mfg. Corp., including $Ca(H_2SO_4).H_2O$.

Aluminum Ammonium Sulfate—Lab Grade sold by ACP Chemical Inc., including $AlNH_4(SO_4)_2.2H_2O$.

A 1 kg of mixture M containing
55.0 wt % of sucrose;
41.5 wt % of tap water;
1.1 wt % of phosphoric acid 75% wt.;
1.0 wt % of aluminium ammonium sulfate; and
1.4 gr (1.4 wt %) calcium phosphate monobasic.
was prepared by adding into a stainless steel container, 550 gr of sucrose, 41.5 gr of tap water, 1.1 gr of phosphoric acid 75%, 1.0 gr of aluminum ammonium sulfate, and 1.4 gr of calcium phosphate monobasic, and then mixed together with a paint mixer until obtaining an homogeneous mixture M.

Then, the resulting homogenized mixture was subjected to heating until a temperature of 100° C. to 103° C. was reached for at least 5 minutes, to thereby form a caramel defining said product A. Said product A was thereafter allowed to cool at room temperature.

In a second step, 515 gr. of a product B which is a colloidal dispersion of submicron-sized silica particles in the form of tiny spheres, in an alkaline aqueous solution and sold under the trademark NALCO 1144®, said NALCO 1144® having the following properties:

| Colloidal Silica as $SiO_2$: | 40%, |
| Average particle Diameter: | 14 nm, |
| pH @ 25° C.: | 9.9, |
| Specific Gravity: | 1.30, |
| Viscosity: | 15 cP, and |
| $Na_2O$ | 0.45%; | was added to the 1.0 kg of the product A obtained in the previous step, and then ingredients A and B were mixed together with said paint mixer. The mixing was carried out at room temperature until an homogeneous composition was obtained (i.e. about 10 minutes). Said composition was comprising about 66 wt % of the product A and about 34 wt % of the product B.

Example 2

A fabric 107 (see FIG. 4) of glass fibers that is substantially free of a sizing material consisting of starch was prepared.

Figure 3:
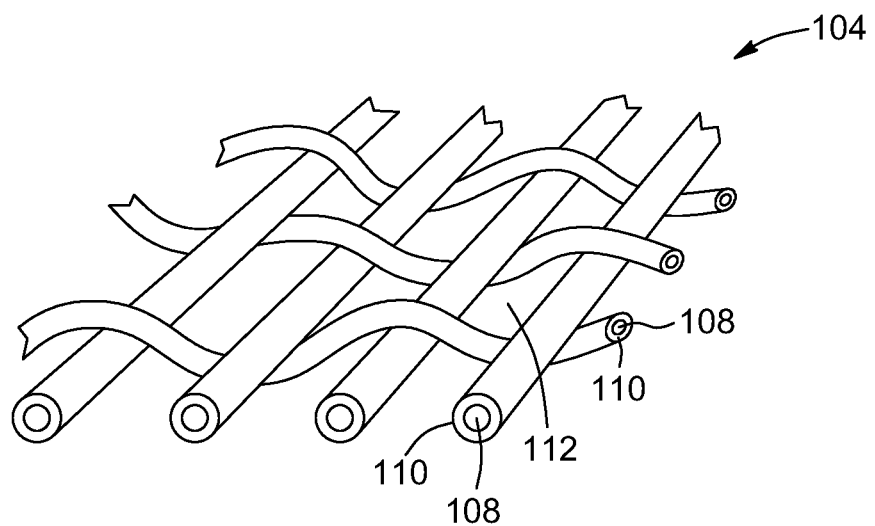
FIG. 3: a partial view of a network of a fabric of threads of glass fibers, said threads being provided with a sizing material, according to the prior art.
Figure 4:
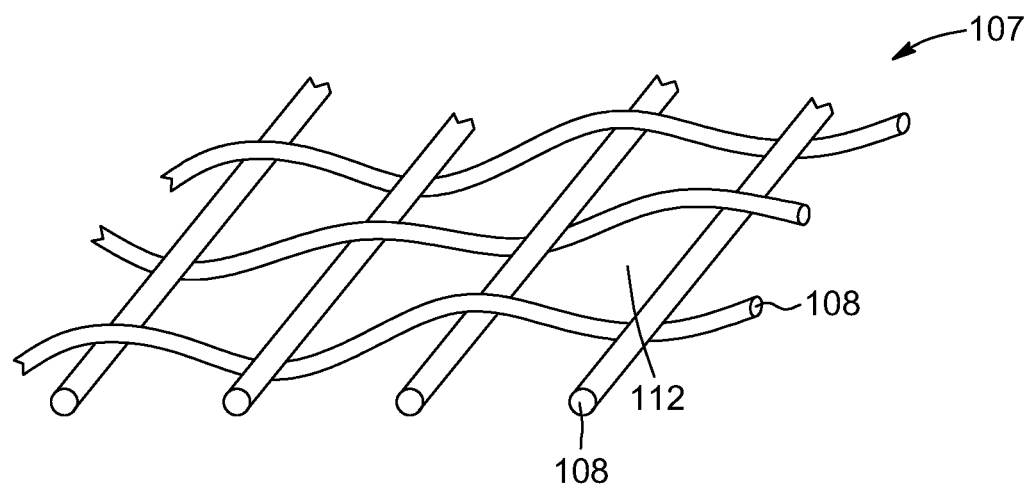
FIG. 4: a partial view of a network of a fabric of threads of glass fibers, after having removed the sizing material (i.e. devoided of sizing material)

More particularly, a fabric 104 of glass fibers (see FIG. 3) consisting of E-Glass threads 108 coated with a layer 110 of starch (as a sizing agent) was subjected to a heat treatment in an oven at 450° C. for about 2 minutes, to burnout said starch (in the presence of oxygen) and thereby remove the sizing agent. FIG. 3 represents the fabric 104 with the threads 108 coated with the layer 110 of starch, and the FIG. 4 represents the fabric 107 with the threads 108. Fabrics 104 and 107 are provided with openings 112. More particularly, the fabric 104 is of the type 40L as defined hereinabove.

Example 3

A rigidified, thermoplastic fabric of glass fibers was prepared according to a method wherein a fabric of glass fibers as obtained from example 2 was impregnated with the composition as defined in example 1, to thus obtain a fabric impregnated with said composition.

Figure 5:
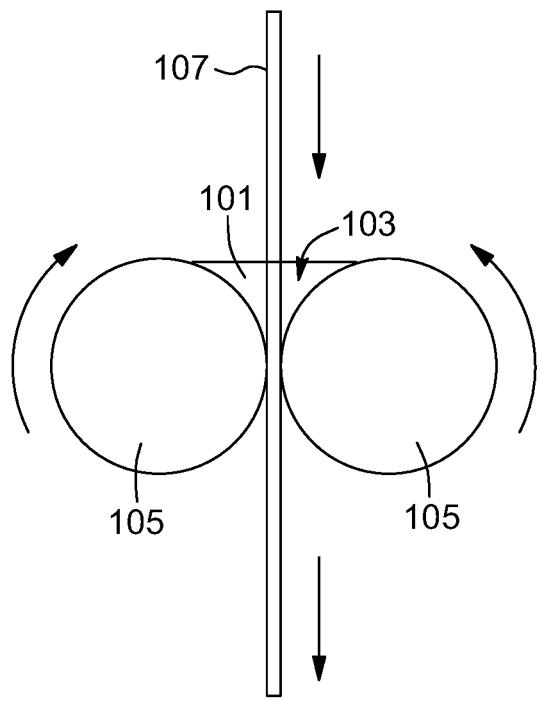
FIG. 5: a schematic view of a two-rollers impregnator to impregnate a fabric of FIG. 4 with a liquid composition according to the invention.

More particularly, the fabric was successively passed in the a reservoir containing said composition and then between a pair of opposite rubber-rolls of a two-rollers impregnator, as schematically illustrated in the enclosed FIG. 5. Said two-rollers impregnator is well known to skilled workman and does not need to be explained in details.

Figure 14:
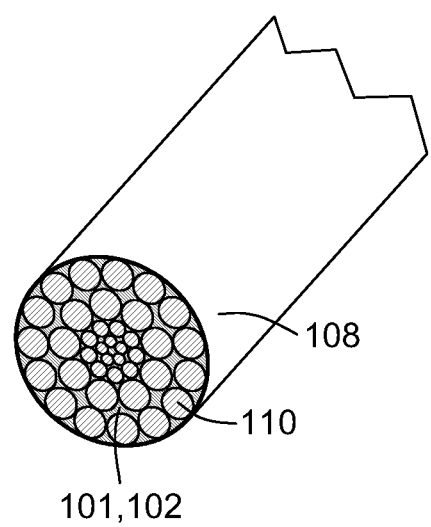
FIG. 14: a partial cross sectional perspective view of a thread of the fabric of FIG. 13, when impregnated with the composition according to the invention.

More particularly, according to the present example, it is to be noted that a composition 101 was contained in a reservoir 103 located above a pair of rubber-rolls 105. The fabric 107 was passed successively across the composition 101 and then between the pair of opposite rubber-rolls 105, which are pressed one against the other, to push an amount of the composition within the openings of the fabric 107. Then, while exiting the rubber-rolls 103, the pressure against the fabric 107 was stopped, an amount of the composition 101 pushed within the opening 102 (see FIG. 14) of the threads 108 of the fabric was retained within said openings of the fabric 107 (e.g. by capillary suction) thereby leaving surfaces of the fabric substantially depleted of excess amount of the composition, and another amount of the composition not retained within the fabric, was adhered to the rubber-rolls and returned to the reservoir 103.

The impregnated fabric so obtained was then subjected to a heating treatment in a continuous oven at a temperature of about 160° C. for about 2 minutes to place the composition impregnated therein into a softened thermoplastic state.

Then, the thermosettable fabric so obtained (i.e. impregnated with the composition transformed into a thermoplastic state) was ready to be used for further treatments such as an optional forming the thermoplastic fabric into a desired size and/or shape, and then a thermosetting treatment to thermoset the composition and provide a rigidified fabric by cross-linking of the heat resistant glass fibers. If not used immediately, the fabric may be allowed to cool at room temperature.

Example 4

The fabric impregnated with the composition obtained from example 3, was cut into a piece of 7 inches×48 inches, and then was subjected to a thermosetting treatment in an oven at 450° C. for 2 minutes, in order to rigidify the fabric by cross-linking of the glass fibers.

Then, the rigidified fabric so obtained can be used as a filter for liquid metal as such liquid aluminum or aluminum alloy. This rigidified fabric which originates from a 40L type fabric of glass fiber as defined hereinabove, is provided with openings of 0.0255 cm². When used for the filtration of liquid aluminum, this filter showed to be as efficient as those of the prior art without the drawbacks.

Example 5

The thermoplastic fabric obtained from example 3, cooled at room temperature, was cut into a piece of 3 inches×3 inches and then placed in a hot mold consisting of a pair of opposite mold halves, to thereby soften and mold the piece of fabric into a desired shape by compression-moulding. Then, the shaped fabric was allowed to cool. More particularly, the shaped fabric was a dome. Alternatively, said shaped fabric may have any appropriate shape, such as for example a «sombrero», a «reverse sombrero» etc.

Then, the shaped fabric so obtained was ready to be used for further treatments such as a thermosetting treatment to thermoset the composition and provide a rigidified fabric by cross-linking of the heat resistant glass fibers.

Example 6

The shaped fabric obtained from example 5, was subjected to a thermosetting treatment in an oven at 450° C. for 2 minutes, in order to rigidify the fabric by cross-linking of the glass fibers of the threads.

Then, the shaped rigidified fabric so obtained can be used as a filter for liquid metal as such liquid aluminum or aluminum alloy, especially in a low pressure casting process. This shaped rigidified fabric which originates from a 40L type fabric of glass fiber as defined hereinabove, is provided with openings of 0.0255 cm². When used for the filtration of liquid aluminum, this filter showed to be as efficient as those of the prior art made of metallic threads, without the drawbacks.

Example 7

The fabric obtained from example 3 was cut into a piece of 3 inches×3 inches, and while being still in a softened thermoplastic state, placed in a cold mold consisting of a pair of opposite mold halves, to thereby obtain a fabric into a desired shape by compression-moulding. The shaped fabric so obtained was a dome. Alternatively, said shaped fabric may have any appropriate shape, such as for example a «sombrero».

Then, the shaped fabric so obtained was subjected to a thermosetting treatment in an oven at 450° C. for 2 minutes, in order to rigidify the fabric by cross-linking of the glass fibers.

Thereafter, the shaped rigidified fabric so obtained can be used as a filter for liquid metal as such liquid aluminum or aluminum alloy, especially in a low pressure casting process. When used for the filtration of liquid aluminum, this filter showed to be as efficient as those of the prior art made of metallic threads, without the drawbacks.

Of course, alternatively, if the fabric obtained from example 3 had cooled at room temperature, said fabric may be reheated to the softened thermoplastic state by any appropriate means.

Figure 1:
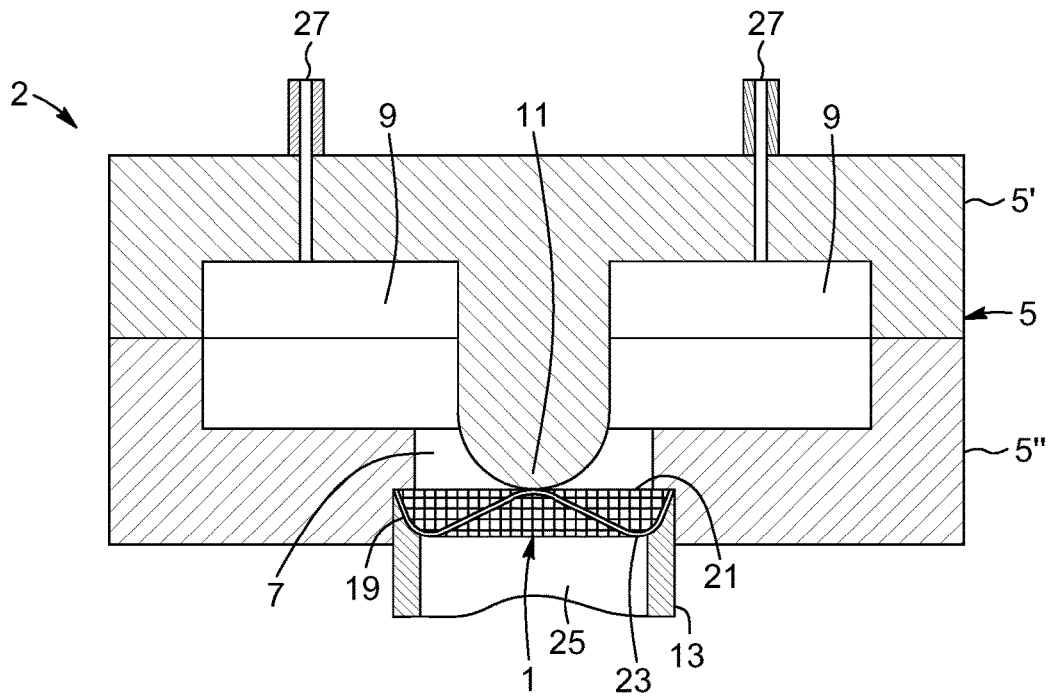
FIG. 1: a schematic illustration of a sombrero-shaped filtration device of the prior art, positioned in a low pressure casting installation, between the top of a rising tube and a diffuser positioned across the filling inlet of a mold.

As mentioned above, FIG. 1 represents a schematic illustration of a sombrero-shaped filtration device 1 according to the prior art, positioned in a low pressure casting installation 2 (shown in part). The low pressure casting installation comprises:
- an air tight reservoir (not illustrated) containing a liquid aluminum alloy;
- a mold 5, preferably made from a pair of opposite parts 5' and 5', the part 5" being mobile to allow an easy removal of the molded article, said mold 5 being provided with a filing inlet 7, a cavity 9 and a diffuser 11 mounted across the filling inlet 7;
- the filtration device 1;
- a rising tube 13 having
    - a lower end (not illustrated) provided with a lower opening immerged into the liquid aluminum alloy contained in the reservoir,
    - an upper end 19 provided with an upper opening 21 connectable with the filing inlet 7 of the mold 5 and provided with a seat portion 23 surrounding the upper opening 21, and
    - a rising channel 25 connecting the lower opening and the upper opening 21, in order to place the reservoir and the filling inlet 7 of the mold 5 in fluid communication when the upper opening 21 is connected with the filing inlet 7, and the filtration device 1 contacted by the diffuser 11; and
- a source of pressurized air entering into the reservoir to displace the liquid aluminum alloy from the reservoir, through the rising channel 25 of the rising tube 13, the filtration device 1 and the filing inlet 7, to fill the cavity 9.

Figure 2:
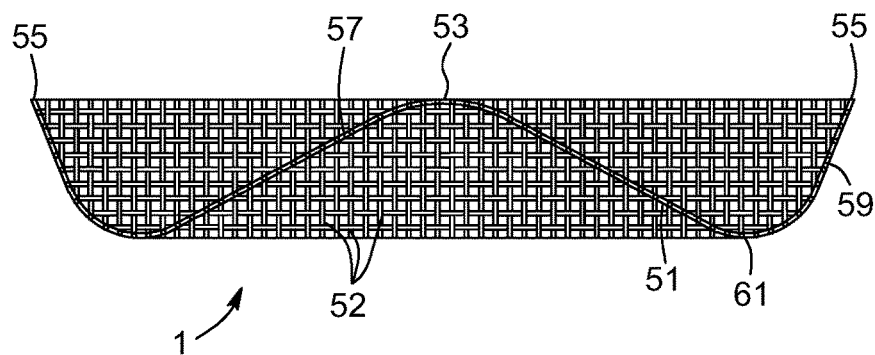
FIG. 2: a cross-sectional view of a sombrero-shaped filtration device according to the prior art.

With reference to FIG. 2, the filtration device 1 according to the prior art, can be made of at least one ply of a rigidified fabric of threads 52 of heat resistant fibers, said fabric being rigidified by a coating applied thereon. More particularly, this filtration device 1 comprises a lower face 51, an upper face 53, a peripheral edge 55, a dome-shaped main portion 57, and a peripheral portion 59 surrounding the main portion 57. The main portion 57 and a part of the peripheral portion 59 are to be positioned across the upper opening 21. The peripheral portion 59 forms a convex rim 61 at the lower face 51 and a concave cavity at the upper face 53. The convex rim 61 is oriented toward the upper opening 21, the upper face of the main portion 57 is positioned against the diffuser 11, and the peripheral portion 59 is partially positioned against the seat portion 23.

However, when the liquid aluminum alloy flows through the filtration device 1, said filtration device is deformed by the pressure of the liquid (i.e. the peripheral portion 59 is lifted above the seat portion 23), and impurities and/or particles contained in the liquid aluminum alloy can be introduced within the cavity 9 along with the liquid aluminum alloy. Also, said deformation of the filtration device 1 under the pressure of the liquid aluminum alloy, can damage and/or partially disintegrate the protective/rigidifying coating of the filtration device, to thereby generate a contamination of the liquid aluminum alloy entering into the cavity 9. The air initially contained in the cavity 9 is evacuated via openings 27.

Therefore, because of numerous drawbacks associated with the use of the filtration device 1, a person skilled in the art was not motivated to use it for the production of aluminum articles made by a low pressure casting process in a low pressure casting installation 2.

Example 8

A rigidified fabric of glass fibers F was prepared according to a method wherein a fabric 107 of threads 108 of glass fibers 110 (see FIGS. 4 and 14) as obtained from example 2 was impregnated according to example 3 with the composition 101 defined in example 1, to thus obtain a fabric impregnated with said composition.

More particularly, with reference to FIG. 5, the fabric 107 was successively passed in the a reservoir 103 containing said composition 101 and then between a pair of opposite rubber-rolls 105 of a two-rollers impregnator. Said two-rollers impregnator is well known to skilled workman and does not need to be explained in details.

More particularly, and according to the present example and with reference to FIG. 5, a composition 101 was contained in a reservoir 103 located above a pair of rubber-rolls 105. The fabric 107 was passed successively across the composition 101 and then between the pair of opposite rubber-rolls 105, which are pressed one against the other, to push an amount of the composition within the openings existing between fibers of the threads 108 forming the fabric 107. Then, while exiting the rubber-rolls 103, the pressure against the fabric 107 was stopped, an amount of the composition 101 pushed within the openings of the threads 108 was retained within said threads (e.g. by capillary suction) thereby leaving surfaces of the fabric substantially depleted of excess amount of the composition, and another amount of the composition not retained within the fabric, was adhered to the rubber-rolls and returned to the reservoir 103.

The impregnated fabric so obtained was then subjected to a heating treatment in a continuous oven at a temperature of about 160° C. for about 2 minutes to place the composition impregnated therein into a softened thermoplastic state.

Then, the fabric F so obtained (i.e. impregnated with the composition transformed into a thermoplastic state) was ready to be used for further treatments such as an optional forming the thermoplastic fabric into a desired size and/or shape, and then a thermosetting treatment to thermoset the composition and provide a rigidified fabric by cross-linking of the heat resistant glass fibers of the threads. If not used immediately, the fabric may be allowed to cool at room temperature.

Example 9

The fabric F obtained from example 8 and cooled at room temperature, was cut into a piece of 3 inches×3 inches and then placed in a hot mold consisting of a pair of opposite mold halves, to thereby soften and mold a filtration device 201 (see FIGS. 6 and 7) having a particular structural shape and orientation, by compression-moulding. Then, the shaped fabric was allowed to cool. Compression moulding is carried out at about 160° C.

Then, the shaped fabric so obtained was ready to be used for further treatments such as a thermosetting treatment to thermoset the composition and provide a rigidified fabric by cross-linking of the heat resistant glass fibers of the threads of glass fibers.

Example 10

The fabric F obtained from example 8 was cut into a piece of 3 inches×3 inch, and while being still in a softened thermoplastic state, placed in a cold mold consisting of a pair of opposite mold halves, to form a filtration device 201 (see FIGS. 6 and 7) having a particular structural shape and orientation, by compression-moulding. Compression moulding is carried out at about 150° C.

Then, the filtration device 201 was subjected to a thermosetting treatment in an oven at 450° C. for 2 minutes, in order to rigidify the fabric by cross-linking of the glass fibers. Of course, alternatively, if the fabric obtained from example 8 had cooled at room temperature, said fabric may be reheated to the softened thermoplastic state by any appropriate means for moulding, and then subjected to the thermosetting treatment. This filtration device 201 made of said rigidified fabric, which originates from a 40L type fabric of glass fiber as defined hereinabove, is provided with openings of 0.0255 cm².

Figure 7:
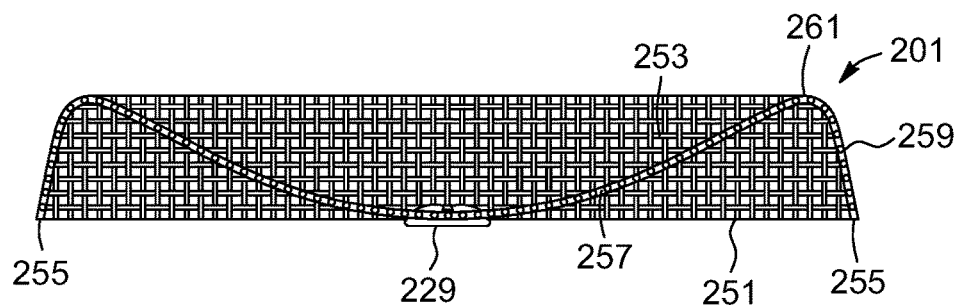
FIG. 7: a cross sectional view according to IV-IV of the filtration device of FIG. 6.
Figure 8:
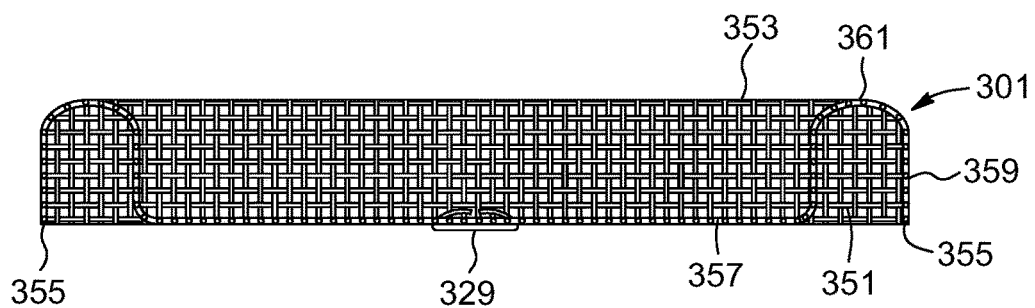
FIG. 8: a cross sectional view of a variant of the filtration device of FIG. 7.
Figure 9:
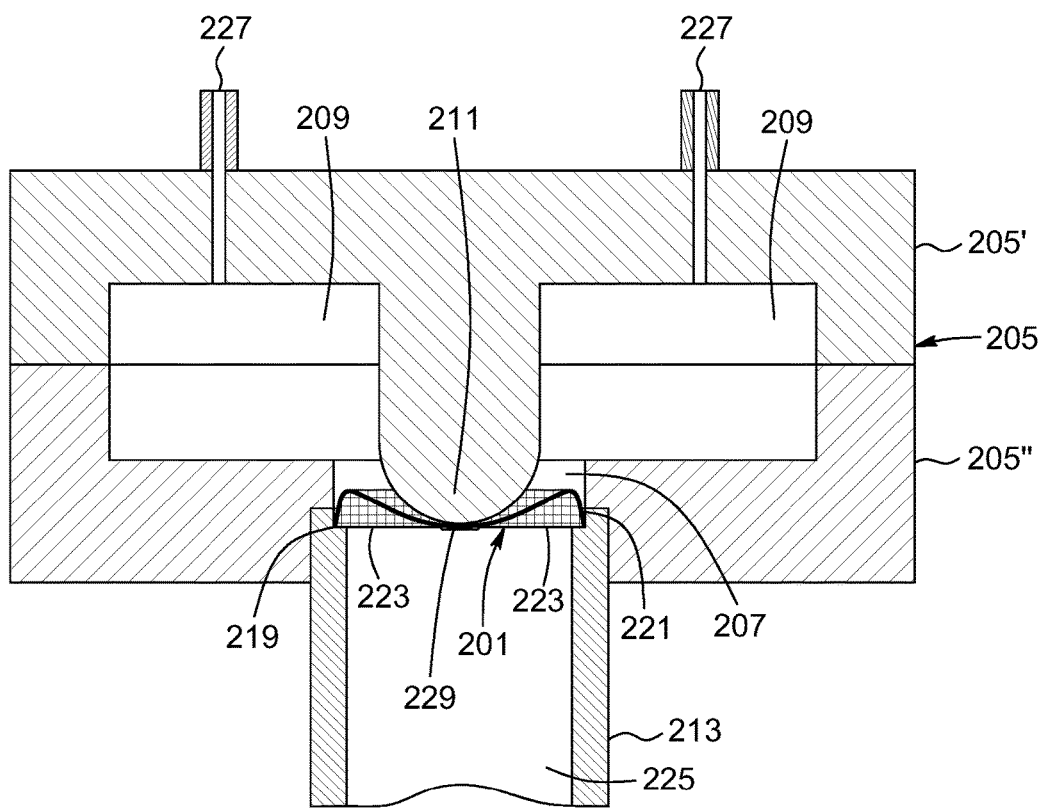
FIG. 9: a partial schematic illustration of the filtration device of FIGS. 6 and 7 positioned in a low pressure casting installation, between a seat portion of an upper end of a rising tube and a diffuser positioned at a filling inlet of a mold (according to the invention)
Figure 10:
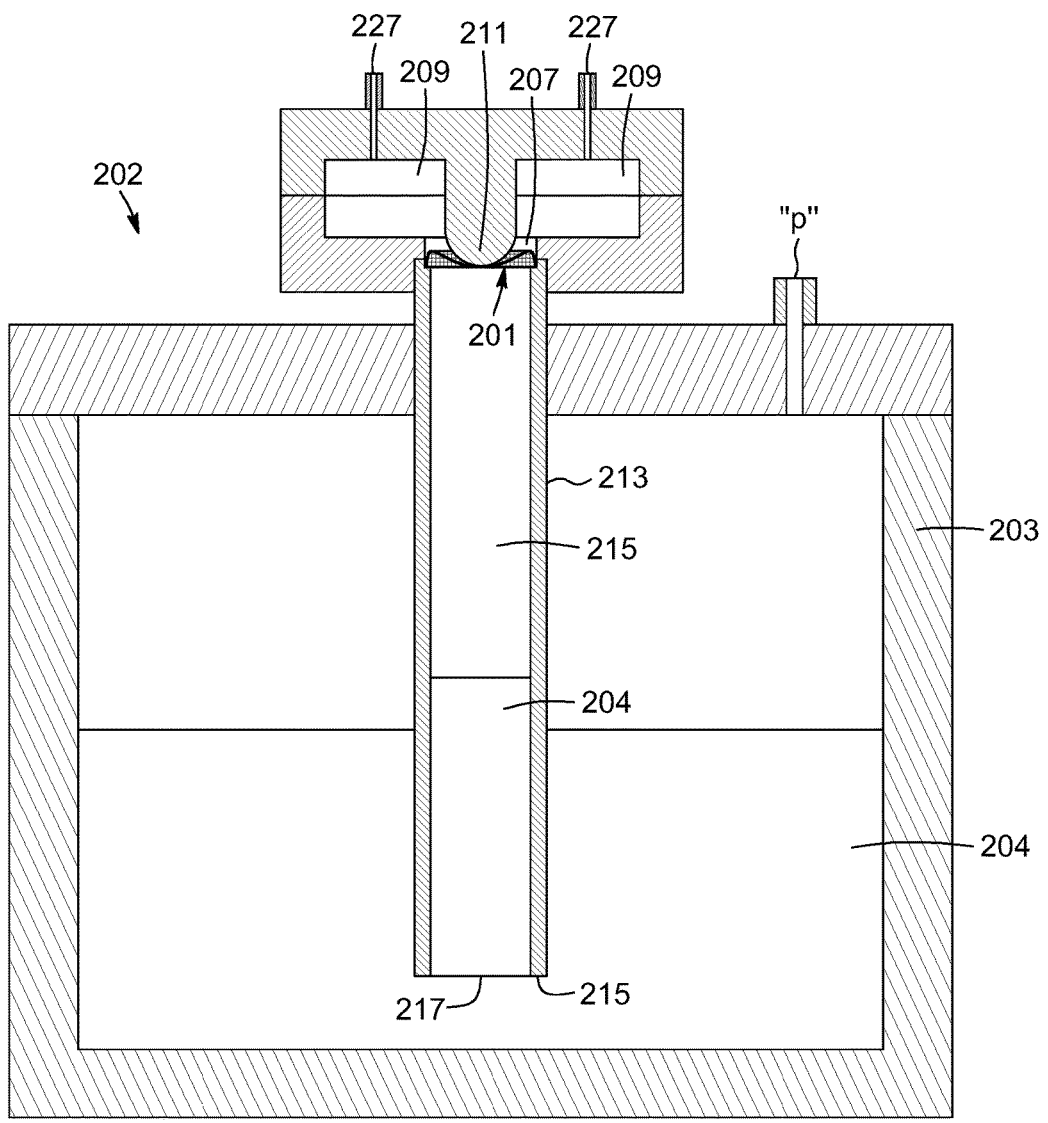
FIG. 10: a schematic illustration of a low pressure casting installation with the filtration device illustrated in FIGS. 6, 7 and 9.

With reference to FIGS. 7 and 8, the filtration device 201 can be used in a low pressure casting installation 202 comprising:

an air tight reservoir 203 containing a liquid aluminum alloy 204;
a mold 205, preferably made from a pair of opposite parts 205' and 205', the part 205" being mobile to allow an easy removal of the molded article, said mold 205 being provided with a filing inlet 207, a cavity 209 and a diffuser 211 mounted across the filling inlet 207;
the filtration device 201;
a rising tube 213 having
    a lower end 215 provided with a lower opening 217 immerged into the liquid aluminum alloy thereof contained in the reservoir,
    an upper end 219 provided with an upper opening 221 connectable with the filing inlet 207 of the mold 205 and provided with a seat portion 223 surrounding the upper opening 221, and
    a rising channel 225 connecting the lower opening and the upper opening 221, in order to place the reservoir and the filling inlet 207 of the mold in fluid communication when the upper opening 221 is connected with the filing inlet 207, and the filtration device 201 contacted by the diffuser 211; and
a source of pressurized air "P" entering 205 into the reservoir 203 to displace the liquid aluminum alloy from the reservoir, through the rising channel 225 of the rising tube 213, the filtration device 201 and the filing inlet 207, to fill the cavity 209. After cooling of the liquid aluminum alloy contained in the cavity 209 to form the molded article, and removal of the same form the cavity 209, the resulting article is provided with the filtration device trapped in a protrusion. The air initially contained in the cavity 209 is evacuated via openings 227.

The diffuser 211 applies a slight pressure against the main portion 257 in order to help maintaining the filtration device 201 in place during the priming of the same. Indeed, it is well known the during the priming phase of a filter, the pressure applied by the liquid starting to flow therethrough is greater and then said pressure falls when the flow of liquid is established.

Figure 6:
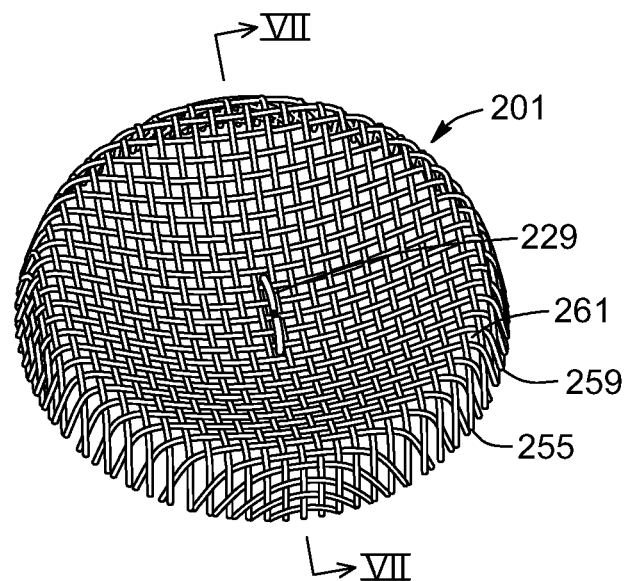
FIG. 6: a perspective view of a filtration device according to the invention.

More particularly, with reference to FIGS. 6 and 7, the filtration device 201 is made of at least one ply of a fabric of rigidified heat resistant fibers. This filtration device 201 comprises a lower face 251, an upper face 253, a peripheral edge 255, a main portion 257, and a peripheral portion 259 surrounding the main portion. The main portion 257 and a part of the peripheral portion 259 are to be positioned across the upper opening 221. The peripheral portion 259 forms a convex rim 261 at the lower face 251 and a concave cavity at the upper face 253, said convex rim 261 being oriented toward the upper opening 221, the upper face of the main portion 257 is positioned against the diffuser 211, and the peripheral portion 259 being in part positioned against the seat portion 223. Optionally, at the center of the main portion 257, a stainless steel 229 staple can be provided. This staple 229 allows the handling of the filtration device 201 with a tool provided with a magnet, for an easy positioning of the peripheral portion 259 against the seat portion 223.

The particular structure and orientation of the filtration device 201 in the low pressure casting installation 202 allows to efficiently filter the liquid aluminum alloy before filling of the cavity 209. More particularly, said filtration device 201 showed to be as efficient as those of the prior art made of metallic threads, without the drawbacks.

Example 11

The thermoplastic fabric obtained from example 3 was cut into a piece of 3 inches×3 inches, and while being still in a softened thermoplastic state, placed in a hot mold consisting of a pair of opposite mold halves, to thereby obtain a filtration device 301 illustrated in FIG. 8, by compression-moulding at about 150° C. Then, filtration device 301 was subjected to a thermosetting treatment in an oven at 450° C. for 2 minutes, in order to rigidify the fabric by cross-linking of the glass fibers of the threads 108 of glass fibers. Thereafter, the filtration device 301 so obtained can be used as a filter for liquid metal as such liquid aluminum or aluminum alloy, especially in low pressure casting process. This filtration device 301 made of said rigidified fabric, which originates from a 40L type fabric of glass fiber as defined hereinabove, is provided with openings of 0.0255 cm$^2$. When used for the filtration of liquid aluminum, this filter showed to be as efficient as those of the prior art made of metallic threads, without the drawbacks.

Figure 11:
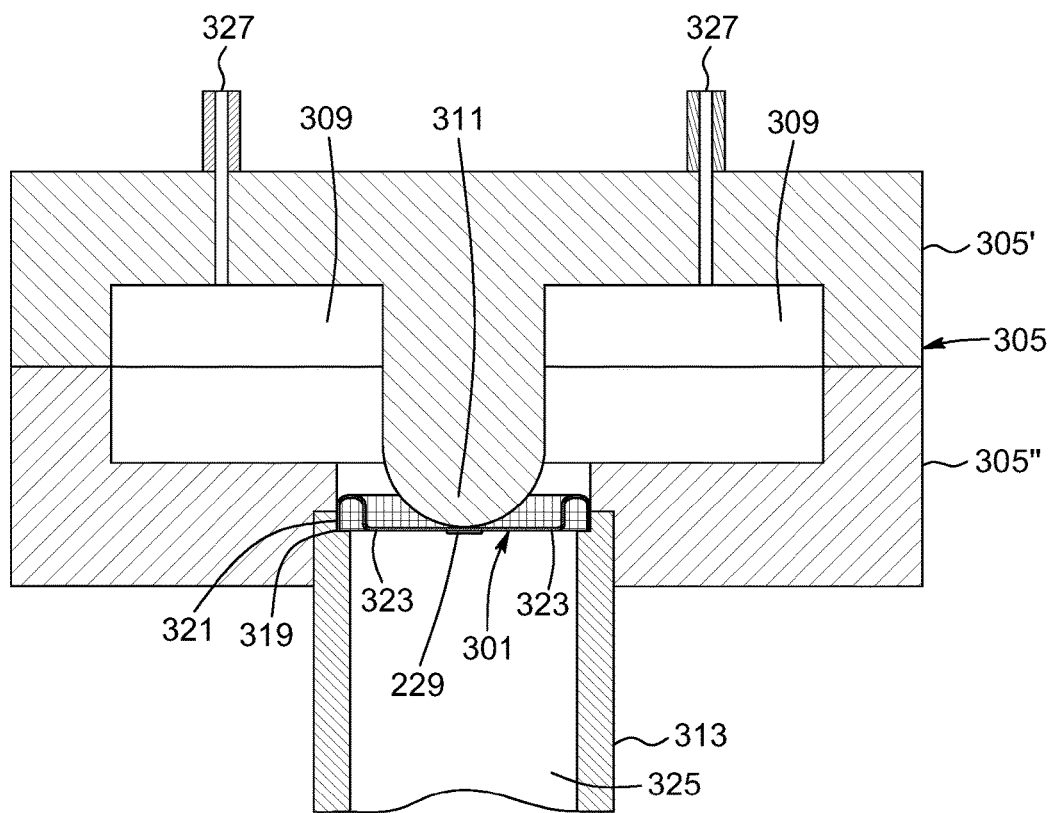
FIG. 11: a partial schematic illustration of the filtration device of FIG. 8 positioned in a low pressure casting installation, between a seat portion of an upper end of a rising tube and a diffuser positioned at a filling inlet of a mold (according to the invention)
Figure 12:
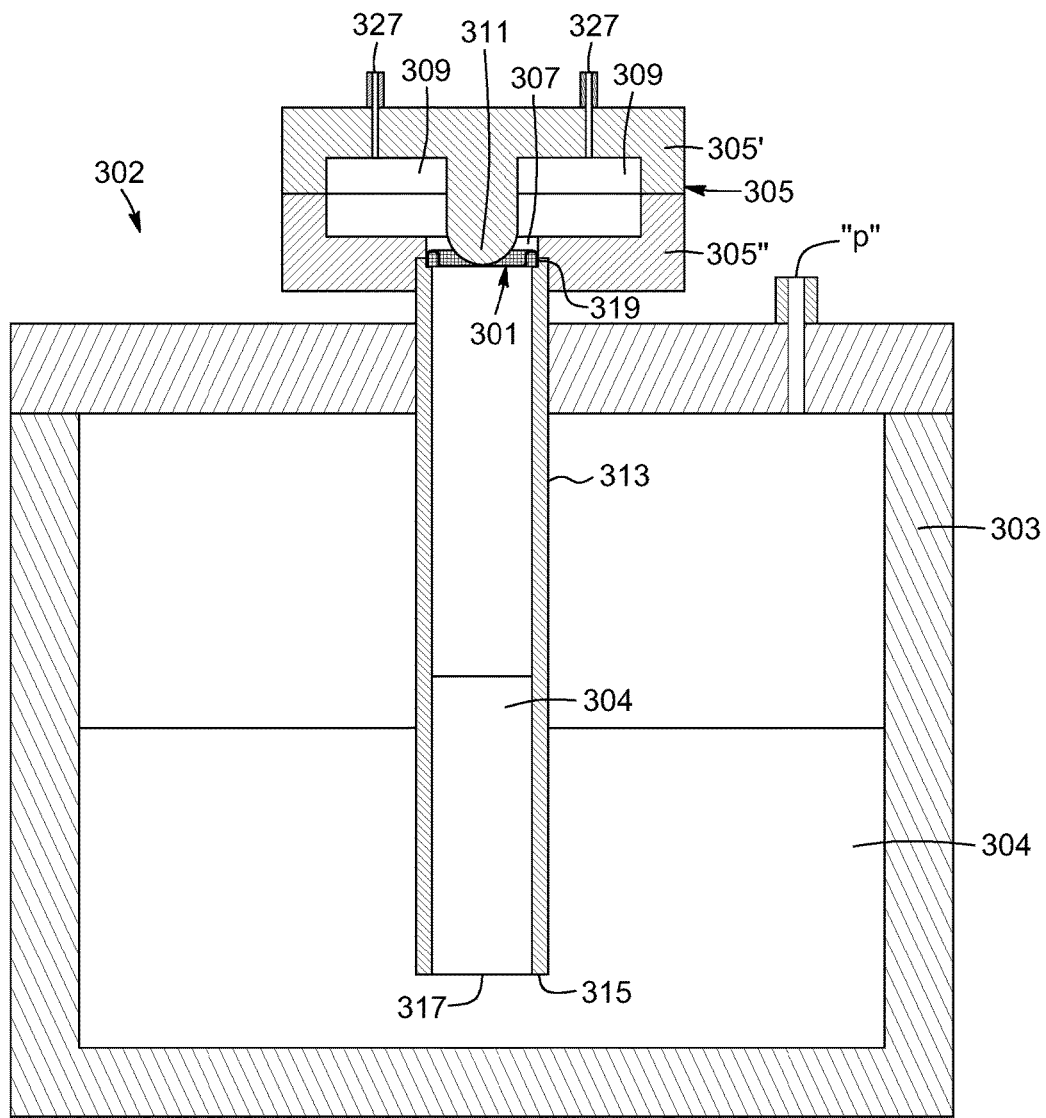
FIG. 12: a schematic illustration of a low pressure casting installation with the filtration device illustrated in FIGS. 8 and 11.

With reference to FIGS. 11 and 12, the filtration device 301 can be used in a low pressure casting installation 302 comprising:
- an air tight reservoir 303 containing a liquid aluminum alloy 304;
- a mold 305, preferably made from a pair of opposite parts 305' and 305', the part 305" being mobile to allow an easy removal of the molded article, said mold 305 being provided with a filing inlet 307, a cavity 309 and a diffuser 311 mounted across the filling inlet 307;
- the filtration device 301;
- a rising tube 313 having
  - a lower end 315 provided with a lower opening 317 immerged into the liquid aluminum alloy contained in the reservoir 303,
  - an upper end 319 provided with an upper opening 321 connectable with the filing inlet 307 of the mold 305 and provided with a seat portion 323 surrounding the upper opening 321, and
  - a rising channel 325 connecting the lower opening and the upper opening 321, in order to place the reservoir and the filling inlet 307 of the mold in fluid communication when the upper opening 321 is connected with the filing inlet 307, and the filtration device 301 contacted by the diffuser 311; and
- a source of pressurized air "P" entering into the reservoir 303 to displace the liquid aluminum alloy from the reservoir 300, through the rising channel 325 of the rising tube 313, the filtration device 301 and the filing inlet 307, to fill the cavity 309. After cooling of the liquid aluminum alloy contained in the cavity 309 to form the molded article, and removal of the same from the cavity 309, the resulting article is provided with the filtration device trapped in a protrusion of the same. The air initially contained in the cavity 309 is evacuated via openings 327.

The diffuser 311 applies a slight pressure against the main portion 357 in order to help maintaining the filtration device 301 in place during the priming of the same. Indeed, it is well known the during the priming phase of a filter, the pressure applied by the liquid starting to flow therethrough is greater and then said pressure falls when the flow of liquid is established.

More particularly, with reference to FIG. 8, the filtration device 301 is made of at least one ply of a fabric of rigidified heat resistant fibers. This filtration device 301 comprises a lower face 351, an upper face 353, a peripheral edge 355, a main portion 357, and a peripheral portion 359 surrounding the main portion. The main portion 357 and a part of the peripheral portion 359 are to be positioned across the upper opening 321. The peripheral portion 359 forms a convex rim 361 at the lower face 351 and a concave cavity at the upper face 353, said convex rim 361 being oriented toward the upper opening 321, the upper face of the main portion 357 is positioned against the diffuser 311, and the peripheral portion 359 being in part positioned against the seat portion 323. Optionally, at the center of the main portion 357, a stainless steel 329 staple can be provided. This staple 329 allows the handling of the filtration device 301 with a tool provided with a magnet, for an easy positioning of the peripheral portion 359 against the seat portion 323.

The particular structure and orientation of the filtration device 301 in the low pressure casting installation allows to efficiently filter the liquid aluminum alloy before filling of the cavity 309. More particularly, as the filtration device 301 which originates from a 40L type fabric of glass fiber as defined hereinabove, it is provided with openings of 0.0255 cm$^2$. Also, when used for the filtration of liquid aluminum as mentioned hereinbefore, this filtration device showed to be as efficient as those of the prior art made of metallic threads, without the drawbacks.

Example 12

Figure 13:
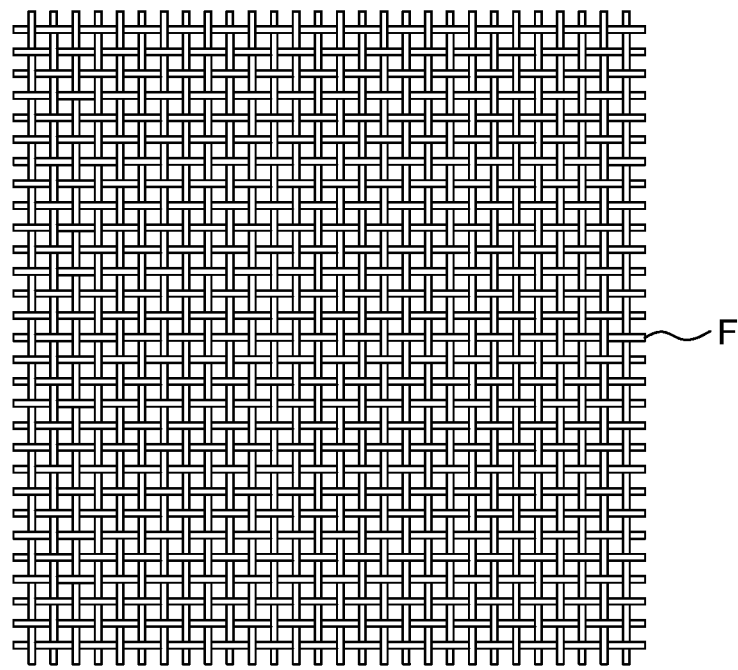
FIG. 13: a view of a thermoplastic fabric as obtained from FIG. 5.
Figure 17:
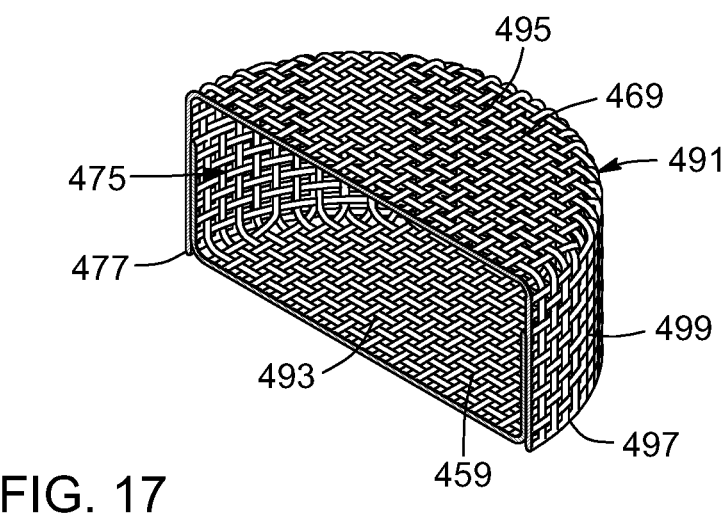
FIG. 17: a partial perspective view of a filtration body comprising the first basket and the second basket to define a new filtration device according to the invention.

A piece of the fabric (see FIG. 13) obtained from example 8, cooled at room temperature, was cut into a piece of 3 inches×3 inches and then placed in a hot mold consisting of a pair of opposite mold halves, to thereby soften and mold a first basket 451 (see FIG. 17) having a particular structural shape and orientation, by compression-moulding. Then, the exceeding fabric is removed by any appropriate cutting means (e.g. scissors, a knife, etc.) and allowed to cool. The compression moulding was carried out at 150° C.

The first basket 451 has an outer wall 453 and a cavity 455 defined by an inner wall 457, an end wall 459 and an opening opposite 461 to the end wall 459.

Figure 15:
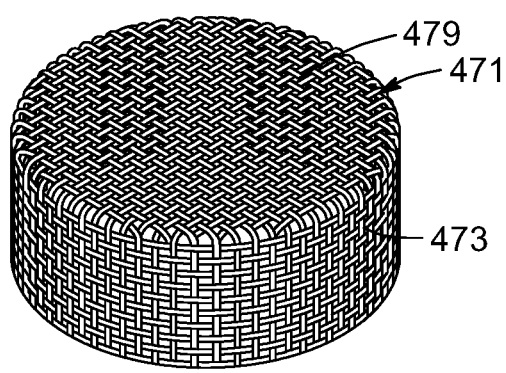
FIG. 15: a perspective view of a first basket according to the invention.

Then, another piece of the fabric obtained from example 8, cooled at room temperature, was cut into a piece of 3 inches×3 inches and then placed in a hot mold consisting of a pair of opposite mold halves, to thereby soften and mold a second basket 471 (see FIG. 15) having a particular structural shape and orientation, by compression-moulding. Then, the exceeding fabric is removed by any appropriate cutting means (e.g. scissors, a knife, etc.) and allowed to cool. The compression moulding was carried out at 150° C.

The second basket 471 has an outer wall 473 and a cavity 475 defined by an inner wall 477, an end wall 479 and an opening opposite to the end wall 479.

Figure 18:
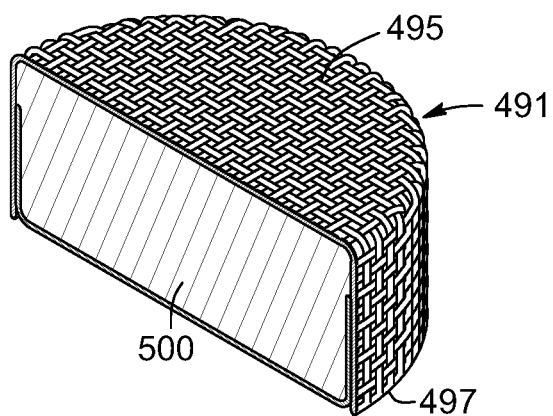
FIG. 18: a partial perspective view of a filtration device where the filtration body comprises the first basket and the second basket, and a filtration pad housed within a cavity of the filtration body.
Figure 19:
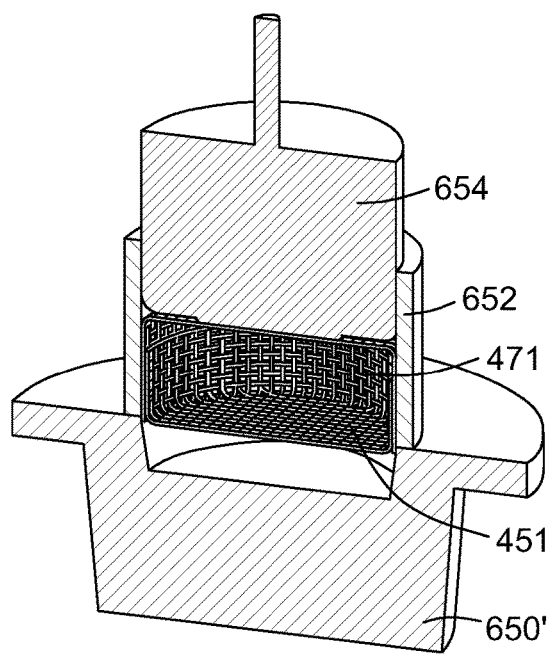
FIG. 19: a cross-sectional view of a device for engaging the first basket and the second basket one into the other, and then in a lower part of a mold.

Then the opened end of the first basket 451 is housed within the cavity 475 of the second basket 471 to define a filtration body 491 having a structural shape and orientation and being provided with a cavity 493, an upper face 495, a lower face 497, and a side face 499. This filtration body 491 defines a filtration device 401. Optionally, as illustrated in FIG. 18, the filtration body 491 is optionally further provided with a filtration pad 500 housed within said cavity 493.

The end wall of the first basket 451 corresponds to the upper face 495 of the filtration body 401, and the end wall 479 of the second basket 471 corresponds to the lower face 497 of the filtration body; the outer wall 453 of the first basket 451 is sized to be friction fit against the inner wall 477 of the second basket 471, the outer wall 453 of the second basket 471 corresponds at least in part to the side face 499 of the filtration body 491 (i.e. the filtration device 401). Alternatively, the outer wall 479 of the second basket 471 can be sized to be friction fit against the inner wall 457 of the first basket 451, the outer wall 473 of the first basket 471 corresponds at least in part to the side face 499 of the filtration body 491 (i.e. the filtration device 401). However, the filtration device 401 illustrated in FIG. 18 is preferred.

Then upper face 495 of the filtration device 401 has a main portion 492 and the lower face 497 of the filtration device 401 has a peripheral portion 494, said main portion 492 being for positioning against a diffuser 411 positioned across a filling inlet 407 of a mold of the low pressure casting installation 402; and said peripheral portion 494 is for positioning across an upper opening 421 of a rising tube 413 of a low pressure casting installation 402, said peripheral portion 494 being to be oriented toward the upper opening 421 of the riser tube 413 and for positioning against a seat portion 423 of the rising tube 413 surrounding the upper opening 421.

Then, the filtration device 401 so obtained, which is still in a thermoplastic stage, was ready for further treatments such as a thermosetting treatment to thermoset the composition and provide the filtration device 401 made of a rigidified fabric by cross-linking of the heat resistant glass fibers which forming the threads of the fabric. Preferably, the thermoset filtration device 401 is prepared by submitting the thermoplastic filtration device to a thermosetting treatment in an oven at 450° C. for 2 minutes, in order to rigidify the fabric by cross-linking of the glass fibers forming the threads of the fabric.

Then the filtration device 401 is ready for use for filtering a liquid metal as such liquid aluminum or aluminum alloy, especially in a low pressure casting process. As this filtration device 401 was made of said rigidified fabric, which originates from a 40L type fabric of glass fiber as defined hereinabove, is provided with openings of 0.0255 cm$^2$. When used for the filtration of liquid aluminum, this filtration device 401 showed to be as efficient as those of the prior art made of metallic threads, without the drawbacks.

Figure 24:
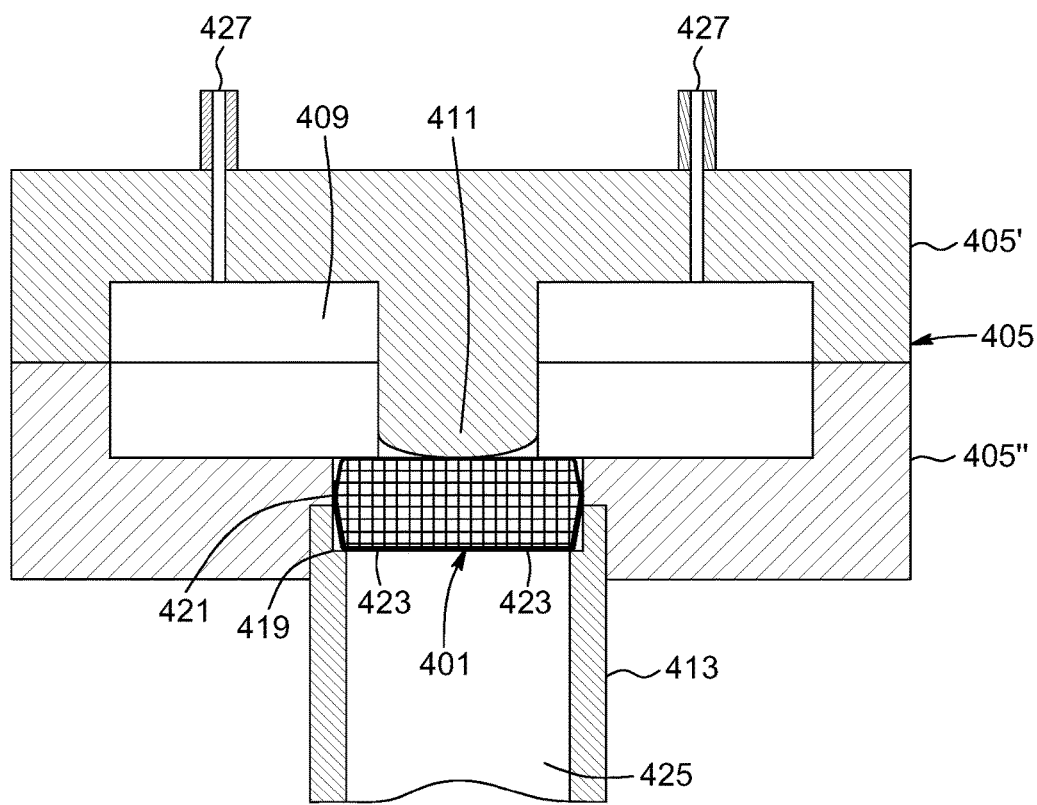
FIG. 24: a schematic illustration of the filtration device of FIGS. 22 and 23 positioned in a low pressure casting installation, between a seat portion of an upper end of a rising tube and a diffuser positioned at a filling inlet of a mold (according to the invention)
Figure 25:
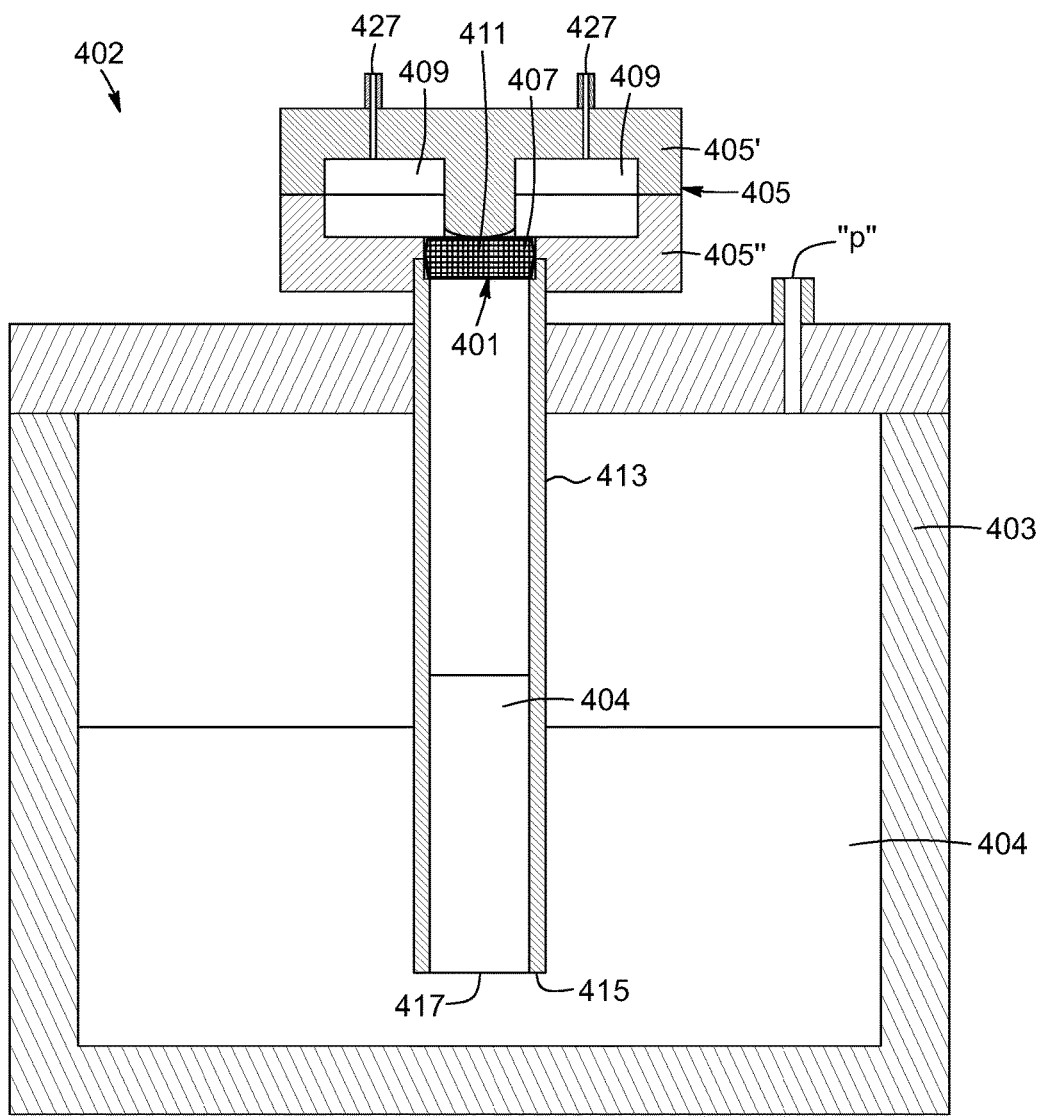
FIG. 25: a schematic illustration of a low pressure casting installation with the filtration device illustrated in FIGS. 22, 23 and 24.

More particularly, referring to FIGS. 24 and 25, the filtration device 401 can be used in a low pressure casting installation 402 comprising:

- an air tight reservoir 403 containing a liquid aluminum alloy 404;
- a mold 405, preferably made from a pair of opposite parts 405' and 405', the part 405" being mobile to allow an easy removal of the molded article, said mold 405 being provided with a filing inlet 407, a cavity 409 and a diffuser 411 mounted across the filling inlet 407;
- the filtration device 401;
- a rising tube 413 having
  - a lower end 415 provided with a lower opening 417 immerged into the liquid aluminum alloy thereof contained in the reservoir,
  - an upper end 419 provided with an upper opening 421 connectable with the filing inlet 407 of the mold 405 and provided with a seat portion 423 surrounding the upper opening 421, and
  - a rising channel 425 connecting the lower opening and the upper opening 421, in order to place the reservoir and the filling inlet 407 of the mold in fluid communication when the upper opening 421 is connected with the filing inlet 407, and the filtration device 401 contacted by the diffuser 411; and
- a source of pressurized air "P" entering 405 into the reservoir 403 to displace the liquid aluminum alloy from the reservoir, through the rising channel 425 of the rising tube 413, the filtration device 401 and the filing inlet 407, to fill the cavity 409. After cooling of the liquid aluminum alloy contained in the cavity 409 to form the molded article, and removal of the same form the cavity 409, the resulting article is provided with the filtration device trapped in a protrusion. The air initially contained in the cavity 409 is evacuated via openings 427.

The diffuser 411 applies a slight pressure against the main portion 457 in order to help maintaining the filtration device 401 in place during the priming of the same. Indeed, it is well known the during the priming phase of a filtration device, the pressure applied by the liquid starting to flow through said filtration device is greater, and then said pressure falls when the flow of liquid is established. As mentioned above, when used for the filtration of liquid aluminum, this filtration device 401 showed to be as efficient as those of the prior art made of metallic threads, without the drawbacks.

Example 13

This example refers to a filtration device 401'. This variant corresponds to the filtration device 401 obtained from example 12 except the first basket 451' and the second basket 471' are mechanically locked together.

A piece of the fabric obtained from example 8, cooled at room temperature, was cut into a piece of 3 inches×3 inches and then placed in a hot mold consisting of a pair of opposite mold halves, to thereby soften and mold a first basket 451' having a particular structural shape and orientation, by compression-moulding. Then, the exceeding fabric is removed by any appropriate cutting means (e.g. scissors, a knife, etc.) and allowed to cool. The compression moulding was carried out at 150° C.

The first basket 451' has an outer wall 453' and a cavity 455' defined by an inner wall 457', an end wall 459' and an opening opposite 461' to the end wall 459'.

Then, another piece of the fabric obtained from example 8, cooled at room temperature, was cut into a piece of 3 inches×3 inches and then placed in a hot mold consisting of a pair of opposite mold halves, to thereby soften and mold a second basket 471' having a particular structural shape and orientation, by compression-moulding. Then, the exceeding fabric is removed by any appropriate cutting means (e.g. scissors, a knife, etc.) and allowed to cool. The compression moulding was carried out at 150° C.

The second basket 471' has an outer wall 473' and a cavity 475' defined by an inner wall 477', an end wall 479' and an opening opposite 481' to the end wall 479'.

Figure 20:
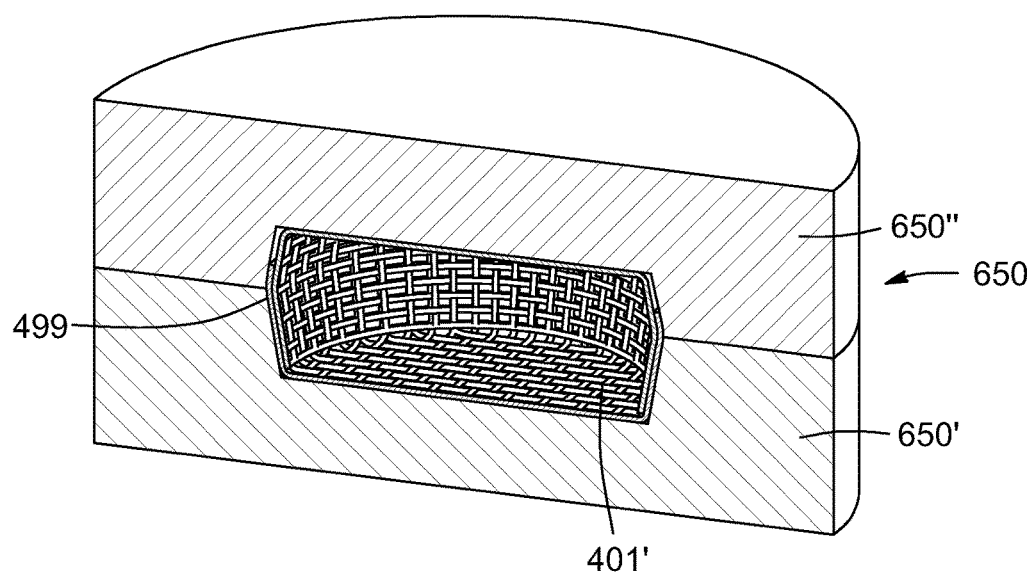
FIG. 20: a cross-sectional view of a filtration device according to the invention within a pair of half-molds for performing the thermosetting step and having the side wall of the filtration body projected outwardly.
Figure 21:
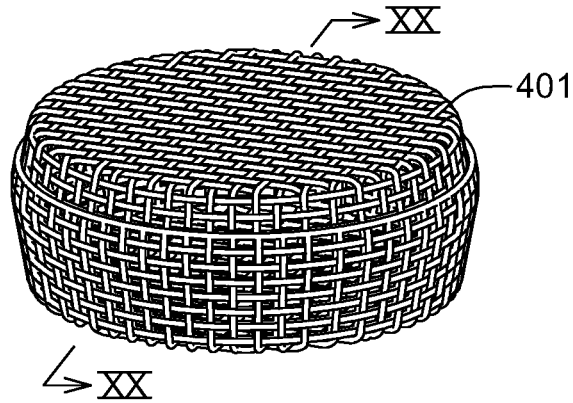
FIG. 21: a perspective view of the filtration device obtained after extraction from the molds illustrated in FIG. 20.
Figure 22:
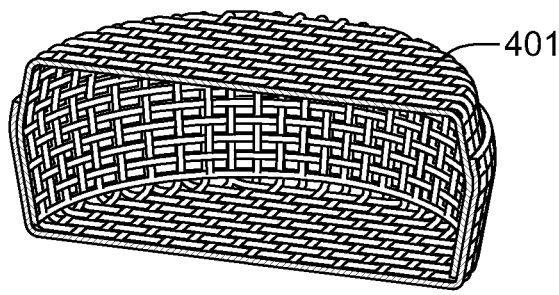
FIG. 22: a cross-sectional view according to XX-XX of the filtration device of FIG. 21.

Then, referring to FIG. 20, the first basket 451' is placed in a lower part 650' of a mold 650, and the second basket 471' is positioned within the cavity 475' by sliding it with a piston 654 across a tube of an element 652. Once the first basket 451' and the second basket 475' form a filtration body 491' having is side wall 499 pushed outwardly to lock both filters together (as illustrated), then element 652' is removed and an upper part 650" of the mold 650 is positioned above the filtration body 491' (see FIG. 21), and the filtration body is subjected to a thermosetting treatment to thermoset the composition and provide a filtration device 401' made of a rigidified fabric by cross-linking of the heat resistant glass fibers. Preferably, the thermosettable filtration device 401' is prepared by submitting the thermosettable filtration device to a thermosetting treatment in an oven at 450° C. for 2 minutes, in order to rigidify the fabric by cross-linking of the glass fibers of the threads forming the fabric.

The filtration device 401' (see FIGS. 23 and 24) so obtained can be used similarly to the filtration device 401 of example 12. Also, as this filtration device 401' was made of said rigidified fabric, which originates from a 40L type fabric of glass fiber as defined hereinabove, was provided with openings of 0.0255 cm$^2$; and when used for the filtration of liquid aluminum, this filter showed to be as efficient as those of the prior art made of metallic threads, without the drawbacks.

Example 14

Figure 23:
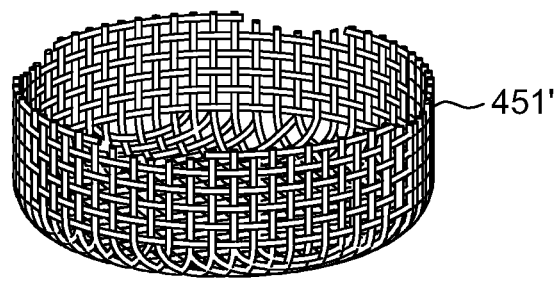
FIG. 23: a perspective view of a variant of the first basket according to the invention.

This example illustrate a variant in the structure of the baskets forming a filtration device similar to the filtration device 401 defined hereinabove. A piece of the fabric obtained from example 8, cooled at room temperature, was cut into a piece of 3 inches×3 inches and then placed in a hot mold consisting of a pair of opposite mold halves, to thereby soften and mold a first basket 451" (see FIG. 23) having a particular structural shape and orientation, by compression-moulding. Then, only part of the exceeding fabric is removed by any appropriate cutting means (e.g. scissors, a knife, etc.) thereby forming an irregular form as illustrated in FIG. 23, and allowed to cool. The compression moulding was carried out at 150° C.

The first basket 451" has an outer wall and a cavity defined by an inner wall, an end wall and an opening opposite to the end wall.

Then, another piece of the fabric obtained from example 8, cooled at room temperature, was cut into a piece of 3 inches×3 inches and then placed in a hot mold consisting of a pair of opposite mold halves, to thereby soften and mold a second basket (not illustrated, similar to the first basket) having a particular structural shape and orientation, by compression-moulding. Then, only part of the exceeding fabric is removed by any appropriate cutting means (e.g. scissors, a knife, etc.) thereby forming an irregular for as illustrated in FIG. 23, and allowed to cool. The compression moulding was carried out at 150° C.

The second basket has an outer wall and a cavity defined by an inner wall, an end wall and an opening opposite to the end wall.

A filtration pad may be optionally housed within the cavity of the first basket and then the opened end of the first basket is housed within the cavity of the second basket to define a filtration body having a structural shape and orientation and being provided with a cavity, an upper face, a lower face, and a side face. Optionally, the filtration body is optionally further provided with a filtration pad housed within said cavity.

Then as exemplified in example 13, the first basket 451" is placed in a lower part of a mold 650, and the second basket is positioned within the cavity of the second basket by sliding a piston 652 across a tube of an element 652. Once the first basket 451 and the second basket form a filtration body having is side wall pushed outwardly to lock both baskets together (as illustrated), then element 652 is removed and an upper part 650" of the mold 650 is positioned above the filtration body, and the filtration body is subjected to a thermosetting treatment to thermoset the composition and provide a rigidified fabric by cross-linking of the heat resistant glass fibers. Preferably, the thermoset filtration device is prepared by submitting the thermoplastic filtration device to a thermosetting treatment in an oven at 450° C. for 2 minutes, in order to rigidify the fabric by cross-linking of the glass fibers.

The filtration device so obtained can be used similarly to the filtration device 401 of example 12. Also, as this filtration device was made of said rigidified fabric, which originates from a 40L type fabric of glass fiber as defined hereinabove, was provided with openings of 0.0255 cm$^2$; and when used for the filtration of liquid aluminum, this filter showed to be as efficient as those of the prior art made of metallic threads, without the drawbacks.

Example 15

Figure 16:
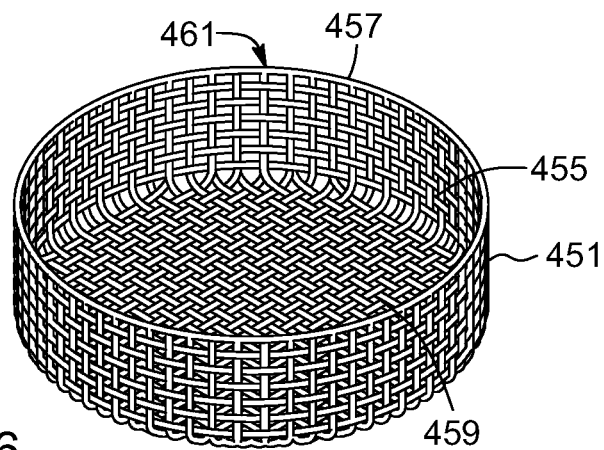
FIG. 16: a perspective view of a second basket according to the invention.

This example illustrate a variant in the structure of the baskets forming a filtration device similar to the filtration device 401 defined hereinabove. A piece of the fabric obtained from example 8, cooled at room temperature, was cut into a piece of 3 inches×3 inches and then placed in a hot mold consisting of a pair of opposite mold halves, to thereby soften and mold a first basket 451 (see FIG. 16) having a particular structural shape and orientation, by compression-moulding. Then, the exceeding fabric is removed by any appropriate cutting means (e.g. scissors, a knife, etc.) and allowed to cool. The compression moulding was carried out at 150° C.

The first basket 451 has an outer wall 453 and a cavity 455 defined by an inner wall 457, an end wall 459 and an opening opposite 461 to the end wall 459.

Then, another piece of the fabric obtained from example 8, cooled at room temperature, was cut into a piece of 3 inches×3 inches and then placed in a hot mold consisting of a pair of opposite mold halves, to thereby soften and mold a second basket 471 (see FIG. 12) having a particular structural shape and orientation, by compression-moulding. Then, the exceeding fabric is removed by any appropriate cutting means (e.g. scissors, a knife, etc.) and allowed to cool. The compression moulding was carried out at 150° C.

The second basket 471 has an outer wall 473 and a cavity 475 defined by an inner wall 477, an end wall 479 and an opening opposite 481 to the end wall 479.

Then a filtration pad 500 is placed in the first basket 451 and then both the filtration pad 500 and the first basket 451, are positioned within the cavity 475 of the second basket 471. Then, the filtration body 491 is placed in a mold 650 as illustrated in FIG. 20, side wall are pushed outwardly to lock both basket together (as illustrated), and then the filtration body 491 and the filtration pad 500 are subjected to a thermosetting treatment to thermoset the composition and provide a rigidified fabric by cross-linking of the heat resistant glass fibers. Preferably, the thermoset filtration device 401' is prepared by submitting the thermoplastic filtration body 491 to a thermosetting treatment in an oven at 450° C. for 2 minutes, in order to rigidify the fabric by cross-linking of the glass fibers.

The filtration device 401' so obtained can be used similarly to the filtration device 401 of example 12. Also, as this filtration device 401' was made of said rigidified fabric, which originates from a 40L type fabric of glass fiber as defined hereinabove, was provided with openings of 0.0255 cm², and when used for the filtration of liquid aluminum, this filter showed to be as efficient as those of the prior art made of metallic threads, without the drawbacks.

The present invention has been described with respect to its preferred embodiments. The description and the drawings are only intended to aid to the understanding of the invention and are not intended to limit its scope. It will be clear to those skilled in the art that numerous variations and modifications can be made to the implementation of the invention without being outside the scope of the invention. Such variations and modifications are covered by the present invention.

The invention will be now described in the following claims:

1. A composition for preparing a rigidified fabric comprising a plurality of heat resistant fibers or a plurality of threads of heat resistant fibers, the heat resistant fibers being glass fibers, silica fibers or a mixture thereof, the composition consisting essentially of a mixture of a product A and a product B:
   the product A being obtained by polymerisation of saccharide units contained in a mixture consisting essentially of the saccharide units, water, and at least one additive selected from the group consisting of acids, inorganic wetting agents, and acid phosphate adhesives; and
   the product B consisting of at least one inorganic colloidal binding agent.

2. The composition of claim 1, wherein the saccharide units are selected from the group consisting of glucose, fructose, galactose, sucrose, maltose, and lactose.

3. The composition for preparing a rigidified fabric of claim 1,
   the product A being obtained by caramelization of a mixture M consisting essentially of:
   sucrose,
   water, and
   at least one additive selected from the group consisting of acids, inorganic wetting agents, and acid phosphate adhesives.

4. The composition of claim 3, wherein the acids are selected from the group consisting of phosphoric acid, sulfuric acid, citric acid, acetic acid, or a mixture of at least two of them; the inorganic wetting agent is aluminum ammonium sulfate, magnesium sulfate, calcium sulfate, or a mixture of at least two of them; and the acid phosphate adhesive is calcium phosphate, magnesium phosphate, aluminum phosphate, or a mixture of at least two of them.

5. The composition of claim 3, wherein the at least one inorganic colloidal agent is a colloidal silica, colloidal alumina, colloidal zirconia, or a mixture of at least two of them.

6. The composition of claim 3, wherein the mixture M consists essentially of:
   30 wt % to 70 wt % of sucrose;
   70 wt % to 30 wt % of water;
   0 wt % to 1.8 wt % of phosphoric acid;
   0 wt % to 1.7 wt % of aluminium ammonium sulfate;
   0 wt % to 2.0 wt % of calcium phosphate monobasic
   at least one of the phosphoric acid, the aluminium ammonium sulfate and/or the calcium phosphate monobasic, being in an amount greater than 0 wt. %.

7. The composition of claim 6, wherein the mixture M comprises:
   55.0 wt % of sucrose;
   41.5 wt % of water;
   1.1 wt % of phosphoric acid;
   1.0 wt % aluminium ammonium sulfate; and
   1.4 wt % calcium phosphate monobasic.

8. The composition of claim 7, wherein phosphoric acid originates from a mixture of 75 wt % $H_3PO_4$ and 25 wt % water, the amount of water being part of the total amount of water of the composition, the aluminium ammonium sulfate is $AlNH_4(SO_4)_2 \cdot 2H_2O$, and the calcium phosphate monobasic is $Ca(H_2PO_4)_2 \cdot 2H_2O$.

9. The composition of claim 3, wherein said composition consists essentially of from 50 wt. % to 85 wt. % of the product A, and from 15 wt. % to 50 wt. % of the product B.

10. The composition of claim 9, wherein said composition consists essentially of about 66 wt % of the product A and about 34 wt % of the product B.

11. The composition of claim 3, wherein the caramelization is carried out by heating the mixture M at a temperature between 100° C. and 103° C. for about 5 minutes, and then allowing the resulting product A to cool.

12. A thermoplastic fabric comprising a plurality of heat resistant fibers or a plurality of threads of heat resistant fibers, the heat resistant fibers being glass fibers, silica fibers or a mixture thereof, wherein the thermoplastic fabric is impregnated with a composition consisting essentially of a mixture of a product A and a product B:
   the product A being obtained by polymerisation of saccharide units contained in a mixture of the saccharide units, water, and at least one additive selected from the group consisting of acids, inorganic wetting agents, and acid phosphate adhesives; and
   the product B consisting of at least one inorganic colloidal binding agent,
the composition being in a thermoplastic state.

13. A rigidified fabric comprising a plurality of heat resistant fibers or a plurality of threads of heat resistant fibers impregnated with a composition consisting essentially of a mixture of a product A and a product B:
   the product A being obtained by polymerisation of saccharide units contained in a mixture of the saccharide units, water, and at least one additive selected from the group consisting of acids, inorganic wetting agents, and acid phosphate adhesives; and
   the product B consisting of at least one inorganic colloidal binding agent,
the composition being in a thermoset stage, and the heat resistant fibers being glass fibers, silica fibers, or a mixture thereof.

14. A filtration device for filtering a liquid metal or an alloy thereof, wherein said filtration device is made of a rigidified fabric comprising a plurality of heat resistant fibers or a plurality of threads of heat resistant fibers impregnated with a composition consisting essentially of a mixture of a product A and a product B:
   the product A being obtained by polymerisation of saccharide units contained in a mixture of the saccharide units, water, and at least one additive selected from the group consisting of acids, inorganic wetting agents, and acid phosphate adhesives; and
   the product B consisting of at least one inorganic colloidal binding agent,
the heat resistant fibers being glass fibers, silica fibers or a mixture thereof.

15. The filtration device according to claim 14 wherein the filtration device has a lower face, an upper face, a peripheral edge, a main portion, and a peripheral portion surrounding the main portion, the peripheral portion being shaped to form a convex rim at the upper face and a concave cavity at the lower face.

16. The filtration device according to claim 15 wherein the filtration device has a lower face, an upper face, a peripheral edge, a main portion, wherein the main portion is a dome having its summit oriented toward the lower face, and a peripheral portion surrounding the main portion, the peripheral portion being shaped to form a convex rim at the upper face and a concave cavity at the lower face.

17. The filtration device of claim 15 further provided with an insert made of a magnetisable material for handling of the filtration device with a tool provided with a magnet.

18. The filtration device of claim 17, wherein the insert is a stainless steel staple.

19. The filtration device of claim 14, wherein the filtration device is made of a first basket and a second basket,
wherein the first basket has an outer wall and a cavity defined by an inner wall, an end wall, and an opening opposite to the end wall,
wherein the second basket has an outer wall and a cavity defined by an inner wall, an end wall, and an opening opposite to the end wall,
wherein the opened end of the first basket is housed in the cavity of the second basket to define a filtration body having a structural shape and orientation and comprising a cavity, an upper face, a lower face, and a side face,
wherein the end wall of the first basket corresponds to the upper face, and the end wall of the second basket corresponds to the lower face,
wherein when the outer wall of the first basket is sized to fit against the inner wall of the second basket, the outer wall of the second basket corresponds at least in part to the side face of the filtration body, or when the outer wall of the second basket is sized to fit against the inner wall of the first basket, the outer wall of the first basket corresponds at least in part to the side face of the filtration body.

20. The filtration device of claim 19, wherein the filtration device further comprises a filtration pad within the cavity.

21. The rigidified fabric of claim 13, the product A being obtained by caramelization of a mixture M consisting essentially of:
sucrose,
water, and
at least one additive selected from the group consisting of acids, inorganic wetting agents, and acid phosphate adhesives.

22. The filtration device of claim 14, the product A being obtained by caramelization of a mixture M consisting essentially of:
sucrose,
water, and
at least one additive selected from the group consisting of acids, inorganic wetting agents, and acid phosphate adhesives.

23. The filtration device according to claim 22, wherein the filtration device has a lower face, an upper face, a peripheral edge, a main portion, and a peripheral portion surrounding the main portion, the peripheral portion being shaped to form a convex rim at the upper face and a concave cavity at the lower face.

24. The filtration device according to claim 23, wherein the filtration device has a lower face, an upper face, a peripheral edge, a main portion, wherein the main portion is a dome having its summit oriented toward the lower face, and a peripheral portion surrounding the main portion, the peripheral portion being shaped to form a convex rim at the upper face and a concave cavity at the lower face.

25. The filtration device of claim 23 further provided with an insert made of a magnetisable material for handling of the filtration device with a tool provided with a magnet.

26. The rigidified fabric of claim 21, wherein the rigidified fabric is made of woven threads of glass fibers, silica fibers, or a mixture thereof.

27. The rigidified fabric of claim 21, wherein the heat resistant fibers are made of E-Glass, S-Glass or High Silica Glass.

28. The filtration device of claim 25, wherein the insert is a stainless steel staple.

29. The filtration device according to claim 22, wherein the filtration device is made of a first basket and a second basket,
wherein the first basket has an outer wall and a cavity defined by an inner wall, an end wall, and an opening opposite to the end wall,
wherein the second basket has an outer wall and a cavity defined by an inner wall, an end wall, and an opening opposite to the end wall,
wherein the opened end of the first basket is housed in the cavity of the second basket to define a filtration body having a structural shape and orientation and comprising a cavity, an upper face, a lower face, and a side face,
wherein the end wall of the first basket corresponds to the upper face, and the end wall of the second basket corresponds to the lower face,
wherein when the outer wall of the first basket is sized to fit against the inner wall of the second basket, the outer wall of the second basket corresponds at least in part to the side face of the filtration body, or when the outer wall of the second basket is sized to fit against the inner wall of the first basket, the outer wall of the first basket corresponds at least in part to the side face of the filtration body.

30. The filtration device according to claim 29, wherein the filtration device further comprises a filtration pad within the cavity.

* * * * *